US010564986B2

(12) United States Patent
Rothman et al.

(10) Patent No.: US 10,564,986 B2
(45) Date of Patent: Feb. 18, 2020

(54) METHODS AND APPARATUS TO SUSPEND AND RESUME COMPUTING SYSTEMS

(71) Applicant: Intel Corporation, Santa Clara, CA (US)

(72) Inventors: Michael A. Rothman, Puyallup, WA (US); Vincent J. Zimmer, Federal Way, WA (US); Glenn J. Hinton, Portland, OR (US); Barnes Cooper, Tigard, OR (US); Leena K. Puthiyedath, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 428 days.

(21) Appl. No.: 15/388,828

(22) Filed: Dec. 22, 2016

(65) Prior Publication Data

US 2018/0181411 A1 Jun. 28, 2018

(51) Int. Cl.
*G06F 1/32* (2019.01)
*G06F 9/44* (2018.01)
*G06F 9/4401* (2018.01)
*G06F 1/3234* (2019.01)

(52) U.S. Cl.
CPC .......... *G06F 9/4418* (2013.01); *G06F 1/3234* (2013.01)

(58) Field of Classification Search
CPC ..... G06F 1/3203; G06F 9/4418; G06F 1/3234
See application file for complete search history.

(56) References Cited

U.S. PATENT DOCUMENTS

| 6,115,765 A * | 9/2000 | Lee ..................... G06F 1/1616 710/302 |
| 2002/0087816 A1* | 7/2002 | Atkinson ............. G06F 12/08 711/156 |
| 2005/0038850 A1* | 2/2005 | Oe ....................... G06F 3/0611 709/203 |
| 2006/0212727 A1* | 9/2006 | Judge .................. G06F 1/3203 713/300 |
| 2009/0164771 A1* | 6/2009 | Reece ................. G06F 1/3203 713/2 |
| 2013/0124842 A1* | 5/2013 | Oh ..................... H04N 1/00885 713/2 |

(Continued)

OTHER PUBLICATIONS

Wojtczuk et al., "Attacking UEFI Boot Script," Jan. 1, 2015, 2 pages.

(Continued)

*Primary Examiner* — Phil K Nguyen
(74) *Attorney, Agent, or Firm* — Hanley, Flight & Zimmerman, LLC

(57) ABSTRACT

A disclosed example method to suspend and resume a device includes: after detecting a low-power suspend mode request, determining a storage performance of the device to store suspend state data; based on the storage performance of the device, setting a suspend flag to indicate a low-power suspend mode to a processor platform; when resuming from the low-power suspend mode, confirming a setting of a resume flag from the processor platform, the resume flag to notify an operating system to resume from the low-power suspend mode; and when the resume flag is set, restoring state data corresponding to an operating system context from a non-volatile dual-purpose system and storage memory.

15 Claims, 8 Drawing Sheets

(56) References Cited

U.S. PATENT DOCUMENTS

2014/0337610 A1* 11/2014 Kawano ................ G06F 9/441
 713/2
2017/0351616 A1* 12/2017 Juenger ................ G06F 1/3275

OTHER PUBLICATIONS

Parrish, "Intel Says Kaby Lake, Apollo Lake, and Optane Are on Track During Computex 2016," Digital Trends, May 31, 2016, 3 pages. [Retrieved online at: www.digitaltrends.com/computing/intel-computex-2016/].

* cited by examiner

METHODS AND APPARATUS TO SUSPEND AND RESUME COMPUTING SYSTEMS

FIELD OF THE DISCLOSURE

The present disclosure relates generally to processor systems and, more particularly, to methods and apparatus to suspend and resume computing systems.

BACKGROUND

Energy Star standards define power levels for acceptable low-power consumption ratings of electronic devices. To comply with such Energy Star standards, electronic devices often implement one or more low-power modes. Such low-power modes include a full-off power state, a suspend-to-RAM (random access memory) power state, a suspend-to-disk (hibernate) state, and/or one or more other types of standby and/or suspend power states. The full-off power state typically consumes the lowest amount of power of any platform power state. However, the full-off power state requires the platform to complete a full boot of the platform software after a power-on operation is re-applied. Such a full boot incurs undesirable boot latencies.

The suspend-to-RAM power state is an alternative to the full-off state. The suspend-to-RAM power state retains the operating state of the platform software as it existed immediately prior to entering the suspend-to-RAM power state. Because the platform software operating state is retained in RAM during the suspend-to-RAM power state, the platform software need only execute portions of a boot process to continue where it left off before entering the suspend-to-RAM state.

BRIEF DESCRIPTION OF THE DRAWINGS

The figures are not to scale. Wherever possible, the same reference numbers are used throughout the drawing(s) and accompanying written description to refer to the same or like parts.

DETAILED DESCRIPTION

Figure 1:
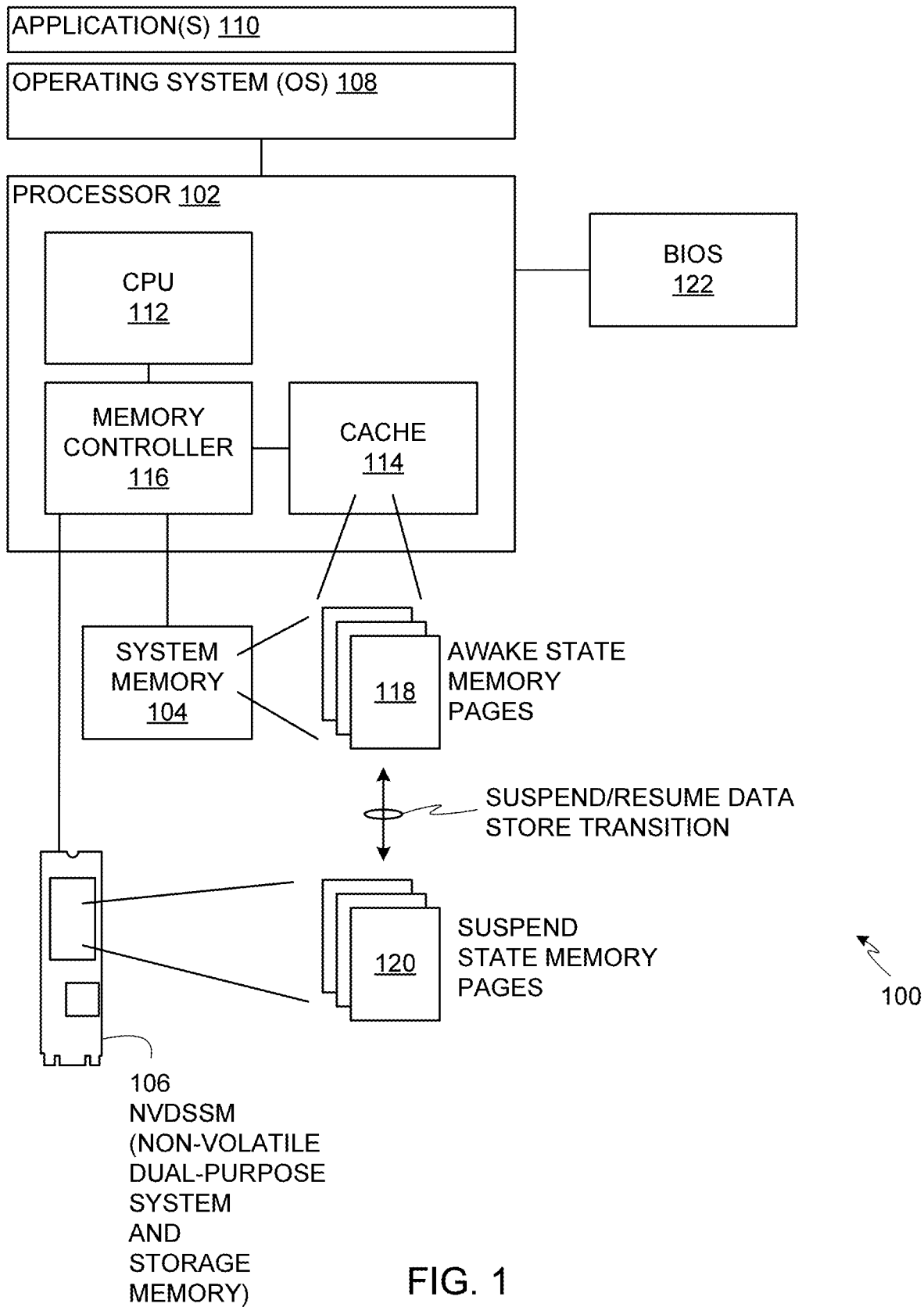
FIG. 1 depicts an example processor platform that may be used to perform suspend and resume operations in accordance with the teachings of this disclosure.

Example methods, apparatus, systems, and articles of manufacture disclosed herein enable suspending and resuming processor systems between awake and low-power consumption states. That is, examples disclosed herein enable placing computing systems in the lowest-power-consuming low-power consumption mode that preserves operating system (OS) and application context while enabling a substantially instant-on resume performance comparable to using a less-power-preserving low-power consumption mode. In many computing systems, the lowest-power-consuming low-power consumption (e.g., zero power consumption) is an S4 suspend-to-disk mode (e.g., a low-power suspend mode), which is also referred to as a hibernate mode. The S4 suspend-to-disk mode is defined in the Advanced Configuration and Power Interface (ACPI) specification which is an open standard that operating systems can use to implement different power states. In the S4 suspend-to-disk mode, all OS and application context (e.g., suspend state data) is maintained by storing it in a non-volatile storage device (e.g., a magnetic hard disk drive (HDD) or a solid state drive (SSD)). Since the OS and application context data is stored in a non-volatile storage device, power is removed from the hardware platform in S4 mode. When resuming from the S4 mode, a basic input/output system (BIOS) startup screen is displayed and all firmware is re-initialized. In many ways, resuming from S4 mode looks like performing a cold boot. However, unlike the cold boot, resuming from the S4 mode involves restoring OS and application context data so that the computing system is placed in the same running state as just prior to being transitioned into the S4 mode.

In some computing systems, an S5 suspend-to-disk mode is also employed as a very low-power consumption mode. However, unlike the S4 mode, the S5 mode does not save OS and application context and, thus, requires a complete boot upon resume/wake. Although S4 and S5 modes achieve very low-power consumption, a drawback to these low-power consumption modes is that they have a very long wake latency when resuming to an awake S0 mode because of the amount of data that needs to be read from the non-volatile storage device and written to cache and/or random access memory (RAM) to restore OS and application context. For example, resuming from an S4 mode in an HDD-based computing system could take as long as two minutes to display a user screen in the awake S0 mode. In SSD-based computing systems, although data read performance of SSDs is better than HDDs, it could still take as long as 20 seconds to resume from an S4 mode to a user screen.

In many computing systems, a higher-power-consuming low-power consumption mode is an S3 suspend-to-RAM (STR) mode (e.g., a low-power standby mode) which is also defined in the ACPI specification. In the S3 STR mode, the display and many hardware subsystems are powered down or placed in a very low power mode such that a user could perceive the computing system as being powered down. However, RAM remains powered to store OS and application context. Since RAM provides faster data access speeds than HDDs and SSDs, resuming from an S3 mode requires significantly less time. The typical amount of time required to resume normal operation to a user-interactive user screen is one to two seconds, which is substantially independent of whether the non-volatile storage device is an HDD or an SSD because context is restored from RAM. Although the S3 mode provides fast resume times, a drawback to S3 mode is that it consumes considerably more power than the S4 or S5 mode due to the need to keep RAM powered. For example, synchronous dynamic RAM (SDRAM) which is often used to implement RAM is a volatile memory that requires continuous power and self-refresh cycles to persist data in its memory cells. Thus, in the S3 mode, SDRAM enters into a self-refresh mode to persist the OS and application context. The S3 mode is a stateful sleep state because it maintains OS and application context in a volatile fashion.

Another low-power consumption mode is a connected standby (S0ix) mode defined by Intel Corporation. There are a number of standby levels in the S0ix connected standby mode spanning across multiple user activities from user actively interacting with a home screen, web browser, email, etc. to a user merely looking at something displayed the screen to a screen timeout event that causes the screen to turn off. Like the S3 STR mode which preserves OS and application context in RAM, the S0ix connected standby mode also preserves readily accessible OS and application context. However, some levels of the S0ix connected standby mode maintain at least some of the OS and application context in CPU cache in addition to RAM. As such, S0ix connected standby modes can resume normal operation to a user screen in an awake S0 mode in one to two seconds like the S3 STR mode. The S0ix connected standby mode can be configured to, in some instances, achieve lower power consumption than the S3 STR mode. However, since its availability, the S0ix connected standby modes have not achieved the same market penetration as the S3 STR mode.

Even though the above-described low-power consumption modes are available in many computing systems (e.g., desktop computers, laptops, tablets, smartphones and other mobile devices, etc.), consumer uses of such low-power consumption modes do not achieve the lowest-power consumption possible in all situations. For example, even though a machine in the S4 or S5 mode is an effective "zero power" appliance, consumer use data shows that many consumers generally do not use a truly powered off solution because of lag times associated with resuming from such S4 or S5 modes. Though many consumers prefer to keep their devices in the S3 or S0ix modes due to the faster resume times, these system states require the platform to draw power from either a wall socket or a battery. As such, the S3 and S0ix modes do not achieve the possible low-power/no-power consumption that could otherwise be achieved through use of the S4 and S5 modes even though such low-power/no-power consumption could be of great benefit to conserve energy when users walk away from their devices for extended durations (e.g., hours or days).

Such missed opportunities to conserve power by using S3 or S0ix modes over S4 or S5 modes may present issues with newer energy efficiency requirements from consumer advocacy bodies and government legislations. Among such energy efficiency requirements is California state legislation in the form of California Energy Commission mandates that take effect on Jan. 1, 2017, for notebooks/servers/workstations, and on Jan. 1, 2018, for desktop and thin-clients in the state of California, United States of America. Such California Energy Commission mandates target an energy savings of 2,702 gigawatt hours per year and a potential monetary savings of $430 million annually through lower power-consumption consumer devices.

Examples disclosed herein enable suspend and resume processes to achieve a fast or enhanced low-power S4 suspend mode. A fast/enhanced low-power S4 suspend mode (e.g., a fast/enhanced low-power suspend mode) disclosed herein achieves the low-power consumption of S4 and S5 low-power modes (which may be used to meet energy efficiency requirements that improve upon prior energy uses by consumer devices) while providing the fast resume-from-suspend performances of higher-power-consumption low-power modes such as the S3 STR mode. To achieve such low-power consumption and fast resume speeds, examples disclosed herein employ enhanced memory partitions and enhanced handshakes (e.g., passing suspend and resume flags) between the OS and the hardware platform so that the OS and the platform can work cooperatively in a hybridized manner to achieve the equivalent of a zero-power state such as the S4 suspend-to-disk mode, while enabling a fast resume time comparable to the S3 STR mode that transitions the platform to a usable user-interface screen (e.g., a login screen) within ~2 seconds. This is, in many cases, an order of magnitude faster than what can be done with prior systems.

In addition to enabling lower power consumption while enabling faster resume times, examples disclosed herein can also be used to improve security aspects of suspend modes by leveraging higher standards of security associated with resuming platforms from a low-power S4 suspend mode. Specifically, performing a resume boot from the low-power S4 suspend mode entails running full host firmware, including Secure Boot (e.g., defined by the Unified Extensible Firmware Interface (UEFI) specification), whereas the low-power S3 standby mode entails reusing some small amount of protected 'replay' information that is vulnerable to being exploited by malicious processes.

Example suspend and resume processes to provide a fast/enhanced low-power suspend mode as disclosed herein can be implemented using non-volatile dual-purpose system and storage memory (NVDSSM). For example, NVDSSM memory may be any memory having non-volatile storage properties to persist data even when power is removed and have high-speed, bit-level, random access to data stored therein. In this manner, such NVDSSM memories can have dual purposes that include: (1) serving as system memory with bit-level, random access memory (RAM) capabilities for temporary storage of randomly accessible instructions and data of firmware, OS and applications during runtime, and (2) serving as longer-term non-volatile storage memory for firmware, OS and application object code that is persisted through active operating states and powered down states of a computing system and can be loaded into system memory for use at runtime. Due to the high-speed and random, bit-level data access requirements of system memory, system memory is traditionally implemented using synchronous dynamic random access memory (SDRAM). Due to the non-volatile and larger storage capacity requirements of storage memory, storage memory is traditionally implemented using flash memory or magnetic disk memory. As such, prior systems that employ two different types of physical memories for system and storage needs are configured to implement different types of low-power consumption modes developed around the different properties of such different types of physical memories.

Example NVDSSM memories may be implemented using 3D NAND flash memories that include Intel® Optane™ technology and Intel 3D XPoint™ technology. For example, NVDSSM memories developed using Intel® Optane™ technology and Intel 3D XPoint™ technology are designed to store data that is randomly accessible at the bit-level with low-latency access (e.g., 10 times lower latency than prior NAND memories) and high-speed data transfer rates (e.g., ~1.5 gigabytes per second (GB/s)) that are faster than conventional NAND memories and comparable to (e.g., the same or better than) double data rate 4 (DDR4) SDRAM due to a cross-point bit cell addressing structure that allows quickly accessing individual bit-level data. In addition, Intel® Optane™ technology and Intel 3D XPoint™ technology is built on 3D NAND technology that provides high-density, non-volatile properties to persist large amounts of data even when power is removed from the corresponding memory devices. Although Intel® Optane™ technology and Intel 3D XPoint™ technology are described as types of technologies to implement NVDSSM memories, any other types of memories having similar high-speed data transfer rates and non-volatile storage characteristics may be used as NVDSSM memories in connection with examples disclosed herein. In some examples, any such other types of memories that may be used as NVDSSM memories may also have low-latency access characteristics.

Disclosed examples are described herein in connection with suspend power states that have the very low power consumption performance of an S4 suspend-to-disk power state (e.g., a low-power S4 suspend mode) but have the fast resume performance of an S3 STR power state (e.g., a low-power S3 standby mode). However, examples disclosed herein may additionally or alternatively be used to implement any other power states in computing systems that employ the dual-purpose characteristics of NVDSSM memories.

FIG. 1 depicts an example processor platform 100 (e.g., a hardware platform) that may be used to perform suspend and resume operations to implement a fast/enhanced low-power suspend mode in accordance with the teachings of this disclosure. The example processor platform 100 includes an example processor 102 in circuit with an example system memory 104 and an example non-volatile dual-purpose system and storage memory (NVDSSM) 106. The processor 102 of the illustrated example is a hardware processor. Although only one processor is shown, examples disclosed herein may be implemented using a multi-processor system. The example system memory 104 may be a volatile memory such as RAM (e.g., dynamic RAM (SDRAM), synchronous DRAM (SDRAM), double data rate SDRAM (DDR SDRAM), static RAM (SRAM), etc.). The NVDSSM memory 106 may be any memory having non-volatile storage properties to persist data even when power is removed and have high-speed, bit-level, random access to data stored therein. For example, the NVDSSM memory 106 may be implemented using 3D NAND flash memories that include Intel® Optane™ technology and Intel® 3D XPoint™ technology as discussed above and/or may be any other suitable type of memory employing high-speed data transfer rates and non-volatile storage characteristics. In the illustrated example, due to its high-speed data transfer rates (~1.5 gigabytes/second (GB/s)) that are fast enough for system memory data accesses, the NVDSSM memory 106 may also be used to operate as system memory to supplement the system memory 104. In the illustrated example of FIG. 1, the example NVDSSM memory 106 also operates as non-volatile memory in the processor platform 100 due to its non-volatile storage characteristics. Although the example system memory 104 and the example NVDSSM memory 106 are shown separate from the processor 102, in some examples the memories 104, 106 may be fabricated as part of the processor 102 (e.g., on a same integrated circuit (IC) die as the processor 102, interconnected with the processor 102 in a same IC package, etc.).

In the illustrated example of FIG. 1, an example operating system (OS) 108 and one or more example application(s) 110 (e.g., a software program) are executed by the processor 102. The example application(s) 110 execute(s) within the context of the OS 108. Examples disclosed herein save state information or context of the OS 108 and/or the application(s) 110 when entering a low-power mode, and restore such state or context of the OS 108 and/or the application(s) 110 when resuming operation from the low-power mode. For example, during runtime execution of the OS 108 and the application(s) 110, a central processing unit (CPU) 112 of the processor 102 stores runtime context data (e.g., variables, software instructions, routines and functions, etc.) that are needed to run the OS 108 and the application(s) 110 in the system memory 104, in the NVDSSM 106, and/or in a cache 114 of the processor 112. Such runtime context data and instructions are shown in the illustrated example of FIG. 1 as awake state memory pages 118. The CPU 112 of the illustrated example is also provided to execute the instructions of the OS 106 and/or the application(s) 110 during runtime to enable operations of the OS 108 and/or the application(s) 110.

The awake state memory pages 118 of the illustrated example include active pages, standby pages, and modified pages. Active pages are pages stored in the cache 114 and/or the system memory 104 that are in active use by one or more running processes. Standby pages are pages that are stored in the system memory 104 but not actively being used by any running process. Modified pages are also pages stored in the system memory 104 but not actively being used by any running process. However, modified pages have changes to their data making their current data different from their original data stored in non-volatile storage memory. As such, modified pages are flagged for flushing to their long-term storage locations in non-volatile storage memory so that their changed data can be updated in the non-volatile storage memory.

In the illustrated example of FIG. 1, the CPU 112 can initiate transitioning the processor platform 100 to a low-power suspend mode in response to detecting a low-power suspend mode request. Example low-power suspend mode requests include a user-based request, a software-based request, and/or a hardware platform-based request. For example, a user-based request can be initiated by a user selecting a sleep option on a user interface. An example software-based request can be an automatic software-generated event by the OS 108 and/or the application 110 in response to detecting a software-based suspend criterion such as an inactivity timeout, a critically low battery, a user-defined suspend time (e.g., every day at midnight), etc. An example hardware platform-based request may be a hardware-generated event by the processor platform 100 in response to detecting a hardware-based suspend criterion such as a physical battery pull event, a power loss event, a network-received suspend signal, etc.

The cache 114 of the illustrated example of FIG. 1 is located in the processor 102 in close proximity to the CPU 112 to provide faster access to data than is possible when accessing data in the system memory 104 and/or the NVDSSM 106. The example cache 114 may be implemented to store less data than the system memory 104 and/or the NVDSSM memory 106. As such, the cache 114 is used to store only data deemed to improve data access efficiency and performance the most. For example, data can be stored in the cache 114 when it is accessed frequently (e.g., a frequency that satisfies a threshold criterion for in cache storage) and/or when it is more recently accessed than other data (e.g., based on a least recently used (LRU) criterion for in-cache storage). In the illustrated example, data is stored in the cache 114 temporarily until it no longer satisfies criteria for remaining in the cache 114. In the illustrated example of FIG. 1, a copy of the data is also stored in the system memory 104 and/or the NVDSSM memory 106 so that when it is overwritten in the cache 114, the data can be subsequently accessed, albeit at a slower access speed, from the system memory 104 and/or the NVDSSM memory 106.

To manage the accessing (e.g., reading and/or writing) of the awake state memory pages 118 in the system memory 104, the NVDSSM 106, and/or the cache 114, the processor 102 is provided with an example memory controller 116. The memory controller 116 of the illustrated example is in circuit with the CPU 110, the system memory 104, the NVDSSM 106, and the cache 114 and is provided as an interface therebetween. For example, the memory controller 116 can manage copying data between different locations of the system memory 104, the NVDSSM 106, and/or the cache 114 based on requests from the CPU 112. To communicate with the NVDSSM memory 106, the example memory controller 116 is provided with a Non-volatile Memory Express (NVMe) interface. The NVMe interface specification is used to access non-volatile storage media attached via, for example, a Peripheral Component Interconnect Express (PCIe) bus.

In the illustrated example of FIG. 1, when the CPU 112 detects such a low-power suspend mode request, the CPU 112 can send a number of memory operation requests to the memory controller 116 to coordinate memory clean-up operations and context saving operations. In the illustrated example of FIG. 1, when the CPU 112 initiates a transition to a low-power suspend mode (e.g., a low-power S4 suspend mode), the memory controller 116 saves context of the OS 108 and/or the application(s) 110 by storing context data from the awake state memory pages 118 to example suspend state memory pages 120 in the NVDSSM memory 106. An example configuration for storing such context data in the NVDSSM memory 106 is described below in connection with FIG. 2. When the CPU 112 initiates a transition to an active or awake S0 mode from the low-power suspend mode, the memory controller 116 restores context of the OS 108 and/or the application(s) 110 by restoring the context data from the suspend state memory pages 120 in the NVDSSM 106 to the awake state memory pages 118 in the system memory 104 and/or the cache 114. Although not shown, in some examples, at least some of the awake state memory pages 118 may also be stored in the NVDSSM 106 during an active or awake S0 mode since the NVDSSM 106 operates as system memory during runtime of the OS 108 and/or the application(s) 110.

The example processor platform 100 is also provided with a basic input/output system (BIOS) 122 in circuit with the processor. The example BIOS 122 includes firmware instructions to perform hardware initialization during a booting process and control data input and output processes between software (e.g., the OS 108 and/or the application(s) 110) and hardware.

Although one of each of the CPU 112, the cache 114, and the memory controller 116 are shown in the processor 102, in other examples that may be used to implement the techniques disclosed herein, the processor 102 may be provided with more than one of each of the CPU 112, the cache 114, and the memory controller 116. In addition, although the example system memory 104 and the example NVDSSM memory 106 are each shown as one block, each of the system memory 104 and/or the NVDSSM memory 106 may be implemented using any number of separate memory devices.

Figure 2:
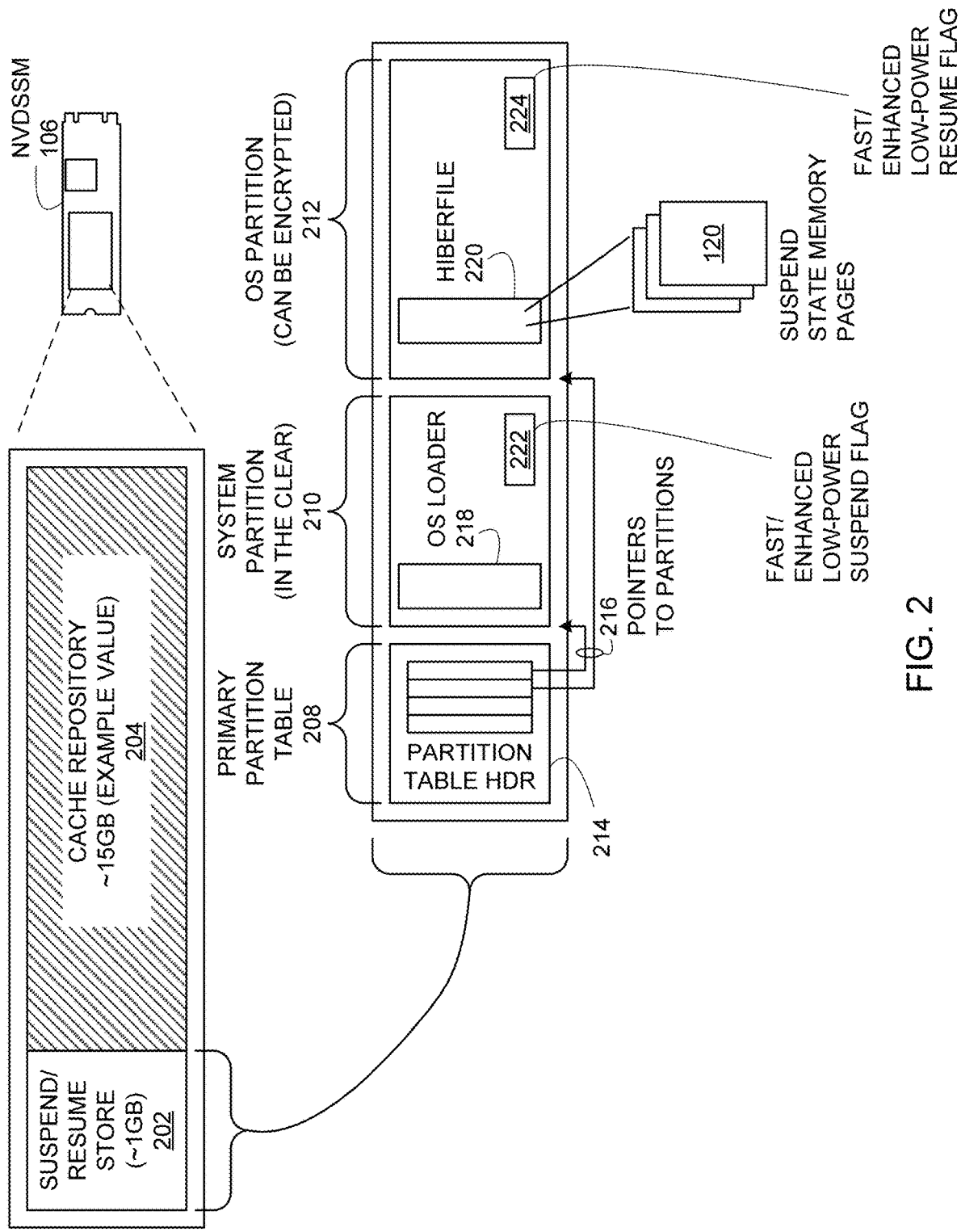
FIG. 2 illustrates an example memory configuration of a non-volatile dual-purpose system and storage memory (NVDSSM) of FIG. 1 that may be used to suspend and resume the processor system of FIG. 1 in accordance with the teachings of this disclosure.

FIG. 2 illustrates an example memory configuration of the NVDSSM memory 106 of FIG. 1 that may be used to suspend and resume the processor platform 100 of FIG. 1 between a fast/enhanced low-power suspend mode and an awake mode in accordance with the teachings of this disclosure. In the illustrated example of FIG. 2, the NVDSSM memory 106 includes an example suspend/resume store area 202 and an example cache repository 204. The example cache repository 204 is a cache store used by an inbox of an Intel® Rapid Start Technology (RST) driver during runtime when the processor platform 100 is in an awake S0 mode to accelerate OS-level runtime operations by supplementing the system memory 104 using the NVDSSM memory 106. The example cache repository 204 of the illustrated example enables the processor platform 100 of FIG. 1 to leverage the high-speed and bit-level, random access characteristics of the NVDSSM memory 106. The cache repository 204 is about 15 GB in the illustrated example, but may be any other suitable size.

The suspend/resume store area 202 of the illustrated example of FIG. 2 is provided to accelerate booting during a resume process. The example suspend/resume store 202 is a suspend-state store area that is provided to store context data of the OS 108 and/or the application 110 during a low-power suspend mode (e.g., S4 mode) of the processor platform 102. In the illustrated example of FIG. 2, the suspend/resume store area 202 is located in a portion of the NVDSSM memory 106 that is set aside for use by the OS 108 to establish the suspend/resume store 202. The reserved suspend/resume store area 202 may be 1 GB or any other suitable size. In some examples, mechanisms for variable sizes of suspend/resume store reservations may be implemented. That is, although the size of the suspend/resume store 202 is shown having a size of ~1 GB in the illustrated example, in other examples, the size of the suspend/resume store 202 may be definable during runtime of the OS 108 based on the amount of storage capacity needed to store, for example, state data (e.g., the suspend state memory pages 120 of FIG. 1) and/or any other data when entering a low-power suspend mode. For example, the size of the suspend/resume store 202 may be based on the size of the context data used by the OS 108 and/or any number of applications 110 that may be running.

In the illustrated example of FIG. 2, the suspend/resume store 202 includes an example primary partition table 208, an example system partition 210, and an example OS partition 212. In the illustrated example, the primary partition table 208 includes a partition table header (HDR) 214 which defines the useable blocks available for the suspend/resume store 202. For example, the partition table HDR 214 stores pointers 216 to the system partition 210 and the OS partition 212. The partition table HDR 214 of the illustrated example of FIG. 2 is defined using a range of logical block addressing (LBA) in a global unique identifiers (GUID) Partition Table (GPT). In some examples, such partitioning format can be leveraged for compatibility with boot operations of prior processor platforms. In other examples, any other suitable types of address organization and partitioning may be used.

In the illustrated example of FIG. 2, the system partition 210 includes an example OS loader 218. The example OS loader 218 is a boot loader having machine readable instructions that the processor 102 of the processor platform 100 (FIG. 1) executes during a boot process. The OS loader 218 of the illustrated example of FIG. 2 includes support code for discovering an example hiberfile 220 on the NVDSSM memory 106 and restoring it into the system memory 104. For example, the processor platform 100 loads and executes the OS loader 218 to restore context of the OS 108 and/or the application(s) 110 when transitioning to an awake S0 mode from a low-power suspend mode (e.g., S4 mode) which includes copying context data from the suspend state memory pages 120 to the awake state memory pages 118. In the illustrated example of FIG. 2, the system partition 210 is in the clear (not encrypted) because the processor platform 100 must be able to find and launch the OS loader 218 outside of the context of the OS 108 (e.g., without having access to encryption keys used by the OS 108 to encrypt data).

The example OS partition 212 includes the example hiberfile 220 to store context data (e.g., variables, software instructions, routines and functions, etc.) that is needed to restore context of the OS 108 and/or the application(s) 110. In the illustrated example of FIG. 2, the hiberfile 220 stores the suspend state memory pages 120. For example, when the CPU 112 detects a low-power suspend mode request to enter into a low-power mode, the CPU 112 initiates a number of operations to coordinate memory clean-up operations and context saving operations. During such operations, the processor 102 copies context data from the awake state memory pages 118 to the suspend state memory pages 120 in the hiberfile 220. In the illustrated example of FIG. 2, the example OS partition 212 may be encrypted by the OS 108 using for example, Microsoft Windows® BitLocker® Drive Encryption or any other suitable encryption technique. The OS partition 212 can be encrypted when entering a suspend mode in the illustrated example because during a resume process it is accessed by the OS 108 which has access to the encryption keys used to encrypt the OS partition 212.

In the illustrated example of FIG. 2, the system partition 210 also stores an example fast/enhanced low-power suspend flag 222. The fast/enhanced low-power suspend flag 222 of the illustrated example is provided to enable the OS 108 to indicate a current low-power state to the processor platform 100 as the fast/enhanced low-power suspend mode. For example, the OS 108 may set the fast/enhanced low-power suspend flag 222 after confirming that the processor platform 100 includes the NVDSSM memory 106 to indicate that the processor platform 100 is in the fast/enhanced low-power S4 suspend mode. In this manner, upon resume, the processor 102 can access the fast/enhanced low-power suspend flag 222 to determine whether to resume from a traditional low-power suspend mode or the fast/enhanced low-power suspend mode.

In the illustrated example of FIG. 2, the OS partition 212 also stores an example fast/enhanced low-power resume flag 224. The fast/enhanced low-power resume flag 224 of the illustrated example is provided to enable the processor platform 100 to signal to the OS 108 to resume from the fast/enhanced low-power suspend mode. For example, when the processor platform 100 is performing operations to resume hardware operation and launch/load the OS loader 218 to resume from the fast/enhanced low-power suspend mode, the processor platform 100 may set the fast/enhanced low-power resume flag 224 to notify the OS 108 that the resume process is to resume from the fast/enhanced low-power suspend mode.

Figure 3:
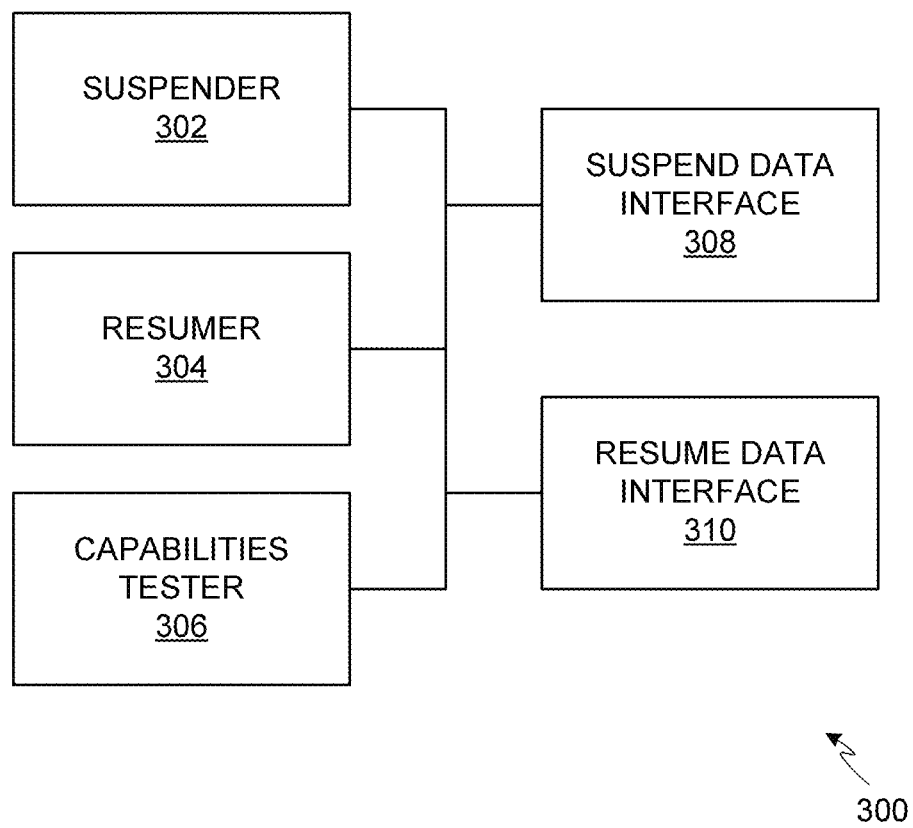
FIG. 3 is an example apparatus that may be used to suspend and resume the processor system of FIG. 1 in accordance with the teachings of this disclosure.

FIG. 3 is an example apparatus 300 that may be used to suspend and resume the processor system 100 of FIG. 1 to implement a fast/enhanced low-power suspend mode in accordance with the teachings of this disclosure. The apparatus 300 includes an example suspender 302, an example resumer 304, an example capabilities tester 306, an example suspend data interface 308, and an example resume data interface 310. The apparatus 300 is provided with the suspender 302 of the illustrated example to detect low-power suspend mode requests including, for example, user-based requests, software-based requests, and/or hardware platform-based requests discussed above in connection with FIG. 1. The example resumer 304 is provided to detect resume requests including, for example, user-based resume requests, software-based resume requests, and/or hardware platform-based resume requests. Example user-based resume requests include requests initiated by a user based on voice activation events, hardware button depresses, user-initiated touchscreen events, etc. Example software-based resume requests include system, OS, or application notifications (e.g., user alarms, appointment events, email receipt, text message receipt, etc.), schedule application events (e.g., recording a television show, downloading data, backing up data, etc.), and/or any other software-based event. Example hardware platform-based resume requests such as network-received system resume commands, etc. The example resumer 304 also accesses the status of the fast/enhanced low-power suspend flag 222 of FIG. 2.

The example capabilities tester 306 is provided to test a suspend state storage performance of memory of the processor platform 100. For example, when the suspender 302 detects a low-power mode request, the capabilities tester 306 can test whether the processor platform 100 includes a NVDSSM memory such as the NVDSSM memory 106 (FIG. 1) to store suspend state data such as the context data of the suspend state memory pages 120 (FIGS. 1 and 2). If the processor platform 100 does include the NVDSSM memory 106, the capabilities tester 306 determines that the processor platform 100 can enter a low-power suspend mode using examples disclosed herein that employ the memory configuration of the NVDSSM memory 106 described above in connection with FIG. 2. An example test that the capabilities tester 306 can be configured to perform includes performing a number of reads to various places in non-volatile storage memory and measuring data access times (e.g., a turn-around time or read access time) of the read data. If a measured access time is less than an access time threshold, the example capabilities tester 306 determines that the processor platform 100 includes the NVDSSM memory 106. Otherwise, the example capabilities tester 306 determines that the processor platform 100 does not include the NVDSSM memory 106. The access time threshold may be set to an access time that a prior non-volatile memory cannot achieve but that is characteristic of the NVDSSM memory 106. That is, because the NVDSSM memory 106 is in communication with the memory controller 116 via a NVMe interface that uses a PCIe bus, the memory controller 116 accesses the NVDSSM memory 106 as a non-volatile memory. As such, if the memory controller 116 accesses other non-volatile memory devices also connected via the PCIe bus as part of the access time tests of the capabilities tester 306, the memory controller 116 will read a number of locations across number of non-volatile memory devices in circuit with the memory controller 116. If such non-volatile memory devices include the NVDSSM memory 106, the capabilities tester 306 will determine that at least one or some of the reads produce access times that satisfy the access time threshold.

The suspend data interface 308 is provided to perform clean-up operations and context saving operations which include copying context data from the awake state memory pages 118 (FIG. 1) to the suspend state memory pages 120 (FIGS. 1 and 2). For example, the suspend data interface 308 can perform the clean-up operations and context saving operations when the suspender 302 detects a low-power mode request. The example suspend data interface 308 is also provided to set the fast/enhanced low-power suspend flag 222 to signal or indicate the fast/enhanced low-power suspend mode to the processor platform 100.

The example resume data interface 310 is provided to locate, load, and/or launch the OS loader 218 of FIG. 2 and/or to locate and/or restore the context data from the suspend state memory pages 120 to the awake state memory pages 118 when the resumer 304 detects a resume request. The example resume data interface 310 is also provided to set the fast/enhanced low-power resume flag 224 to notify the OS 108 that a resume process is to resume from the fast/enhanced low-power suspend mode.

While an example manner of implementing the apparatus 300 is illustrated in FIG. 3, one or more of the elements, processes and/or devices illustrated in FIG. 3 may be combined, divided, re-arranged, omitted, eliminated and/or implemented in any other way. Further, the example suspender 302, the example resumer 304, the example capabilities tester 306, the example suspend data interface 308, and the example resume data interface 310 and/or, more generally, the example apparatus 300 of FIG. 3 may be implemented by hardware, software, firmware and/or any combination of hardware, software and/or firmware. For example, in some implementations some of example suspender 302, the example resumer 304, the example capabilities tester 306, the example suspend data interface 308, and/or the example resume data interface 310 may be implemented by the processor 102 and others of the example suspender 302, the example resumer 304, the example capabilities tester 306, the example suspend data interface 308, and/or the example resume data interface 310 may be implemented by the OS 108. Any of the example suspender 302, the example resumer 304, the example capabilities tester 306, the example suspend data interface 308, the example resume data interface 310, and/or, more generally, the example apparatus 300 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example suspender 302, the example resumer 304, the example capabilities tester 306, the example suspend data interface 308, and/or the example resume data interface 310 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 300 of FIG. 3 may include one or more elements, processes and/or devices in addition to, or instead of, those illustrated in FIG. 3, and/or may include more than one of any or all of the illustrated elements, processes and devices.

Flowcharts representative of example machine readable instructions for implementing the apparatus 300 of FIG. 3 are shown in FIGS. 4-7. In these examples, the machine readable instructions implement programs for execution by a processor such as the processor 102 of FIG. 1 and also shown in the example processor platform 800 discussed below in connection with FIG. 8. The programs may be embodied in software stored on a tangible computer readable storage medium such as a CD-ROM, a floppy disk, a hard drive, a digital versatile disk (DVD), a Blu-ray disk, or a memory associated with the processor 102, but the entire program and/or parts thereof could alternatively be executed by a device other than the processor 102 and/or embodied in firmware or dedicated hardware. Further, although the example programs are described with reference to the flowcharts illustrated in FIGS. 4-7, many other methods of implementing the example apparatus 300 may alternatively be used. For example, the order of execution of the blocks may be changed, and/or some of the blocks described may be changed, eliminated, or combined.

As mentioned above, the example processes of FIGS. 4-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
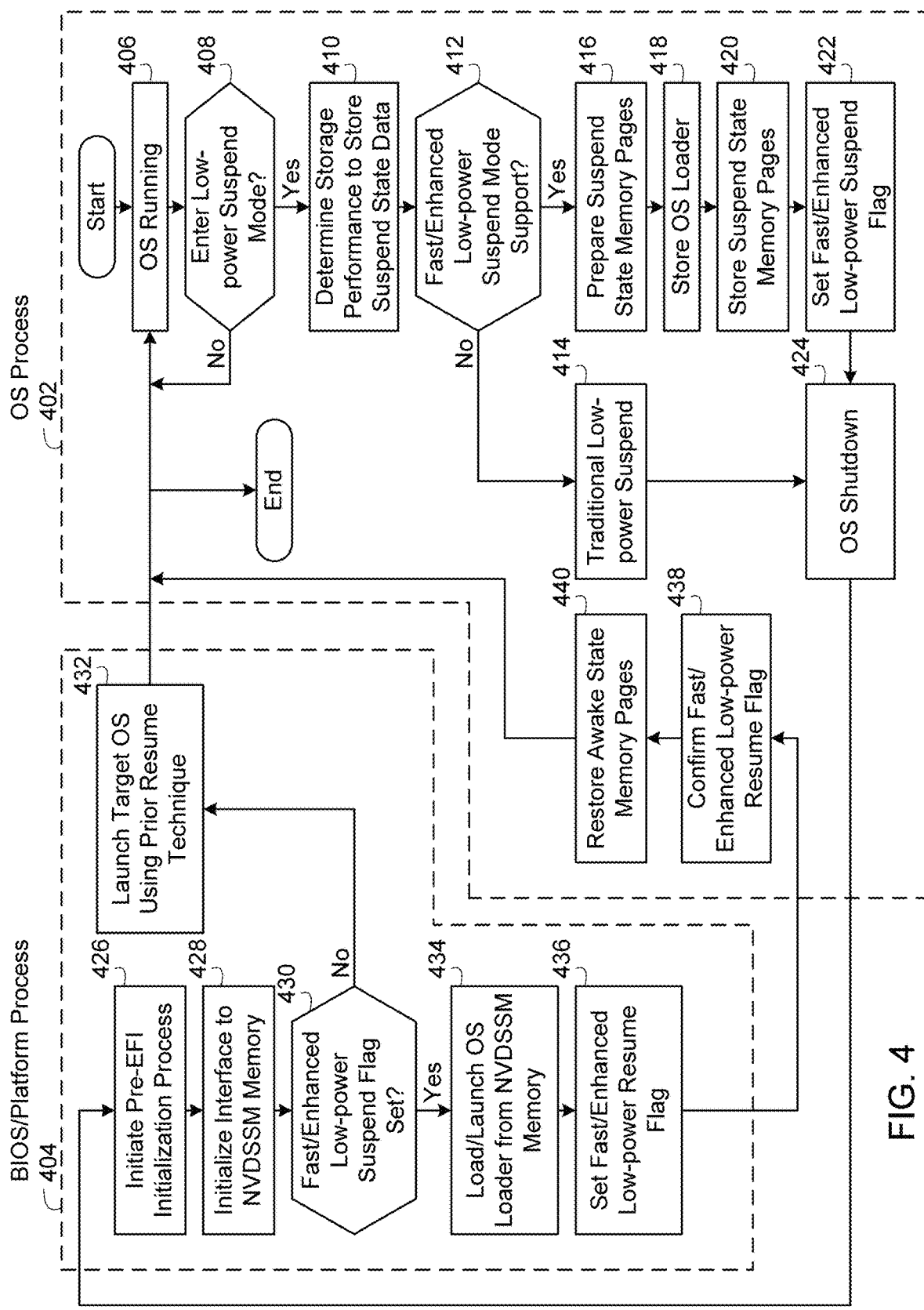
FIG. 4 is a flow diagram representative of example machine readable instructions that may be executed by a processor to perform suspend and resume processes in accordance with the teachings of this disclosure based on an operating system (OS) and platform targeting a same low-power mode.

FIG. 4 is a flow diagram representative of example machine readable instructions that may be executed by the processor 102 to perform suspend and resume processes based on the OS 108 and the processor platform 100 of FIG. 1 targeting a same low-power mode. The example process of FIG. 4 involves both the OS 108 and the processor platform 100 targeting to enter the fast/enhanced low-power S4 suspend mode.

The flowchart of FIG. 4 shows two example processes that include an example OS process 402 and an example BIOS/platform process 404. In the illustrated example of FIG. 4, the BIOS/platform process 404 is performed by the processor 102 of FIG. 1 (e.g., using firmware instructions in the BIOS 122 of FIG. 1 outside the context of the OS 108), and the OS process 402 is performed by the OS 108 of FIG. 1 (e.g., OS processes executed by the processor 102). In the example of FIG. 4, components of the apparatus 300 that operate in the OS process 402 are implemented by the OS 108 as computer readable instructions executed by the processor 102. Additionally, components of the apparatus 300 that operate in the BIOS/platform process 404 are implemented using logic circuits of the processor 102 and/or by firmware computer readable instructions (e.g., in the BIOS 122) executed by the processor 102.

The OS process 402 of FIG. 4 begins at block 406 at which the OS 108 is running. In the illustrated example of FIG. 4, the suspender 302 (FIG. 3) determines when the processor platform 100 is to enter a low-power suspend mode (block 408). For example, the suspender 302 can monitor for low-power suspend mode requests to enter into a low-power S4 suspend mode. In the illustrated example of FIG. 4, when the suspender 302 determines that a low-power suspend mode has not been requested, the OS 108 continues running. However, when the example suspender 302 determines at block 408 that a low-power suspend mode has been requested, control advances to block 410. At block 410, the example capabilities tester 306 determines a storage performance of the processor platform 100 for storing suspend state data (e.g., OS and/or application context). For example, the capabilities tester 306 can perform a number of reads to various places in non-volatile storage memory and comparing data access times to an access time threshold as discussed above in connection with FIG. 3 to determine whether the processor platform has the NVDSSM memory 106 to support a fast/enhanced low-power suspend mode. When the example capabilities tester 306 determines at block 412 that the suspend state storage performance of the processor platform 100 does not support fast/enhanced low-power suspend mode (e.g., the NVDSSM memory 106 is not present), the processor 102 enters into a traditional low-power suspend mode using a prior low-power suspend process (block 414).

When the example capabilities tester 306 determines at block 412 that the suspend state storage performance of the processor platform 100 supports the fast/enhanced low-power suspend mode (e.g., the NVDSSM memory 106 is present), control advances to block 416. At block 416, the suspend data interface 308 (FIG. 3) prepares the suspend state memory pages 120 (FIGS. 1 and 2). For example, the suspend data interface 308 initiates a deep flush of the awake state memory pages 118 (FIG. 1) that involves deleting unnecessary standby pages from the system memory 104, writing modified data back to non-volatile memory from modified pages, and saving active and standby pages that are needed to save the state of OS and/or application context into the suspend state memory pages 120. In the illustrated example, the deep flush of the awake state memory pages 118 decreases the amount of data needed to store the suspend state data (e.g., OS and/or application context). As such, the deep flush of the awake state memory pages 118 decreases the size of the hiberfile 220 (FIG. 2), which will store the suspend state data (e.g., OS and/or application context) as part of the suspend state memory pages 120. In this manner, space requirements for storing the hiberfile 220 in the OS partition 212 (FIG. 2) of the NVDSSM 106 can be decreased. At block 418, the example suspend data interface 308 stores the OS loader 218 (FIG. 2). For example, the suspend data interface 308 writes the OS loader 218 to the system partition 210 of the suspend/resume store 202 (FIG. 2) in the NVDSSM memory 106 to enable a fast/enhanced low-power S4 suspend mode. At block 420, the example suspend data interface 308 stores the suspend state memory pages 120. For example, the suspend data interface 308 writes the suspend state memory pages 120 as the hiberfile 220 to the OS partition 212 (FIG. 2) in the NVDSSM memory 106 to enable the fast/enhanced low-power S4 suspend mode.

In the illustrated example of FIG. 4, the suspend data interface 308 also sets the fast/enhanced low-power suspend flag 222 of FIG. 2 (block 422). For example, the suspend data interface 308 can write the fast/enhanced low-power suspend flag 222 to the system partition 210 to indicate the fast/enhanced low-power S4 suspend mode to the processor platform 100. The fast/enhanced low-power suspend flag 222 is written in the system partition 210 without encryption so that upon resume the processor 102 can access the flag 222 to determine whether to resume from a traditional low-power suspend mode or the fast/enhanced low-power suspend mode.

The example OS 108 shuts down (block 424). For example, since the OS and/or application context is stored in a non-volatile fashion in the hiberfile 220 of the NVDSSM memory 106, the OS 108 can shutdown and send a request to the BIOS 122 to power down the processor platform 100. For example, the BIOS 122 can instruct a power management unit of the processor platform 100 to turn off power to the processor platform 100.

Turning now to the BIOS/platform process 404, after some time the example resumer 304 detects a resume request. After such a resume request, control advances to block 426. At block 426, the resumer 304 initiates an example pre-EFI initialization process. In the illustrated example of FIG. 4, the pre-EFI (extensible firmware interface) initialization process discovers the boot mode to be used, launches modules that initialize main memory, and discovers and launches system firmware. In the illustrated example, early hardware initialization performed as part of the pre-EFI initialization process includes initializing BIOS Memory Reference Code (MRC), which is used to initialize the memory controller 116 (FIG. 1) and optimize read/write timing and memory voltages for optimal memory performance.

The example memory controller 116 (FIG. 1) initializes a memory interface to the NVDSSM memory 106 (block 428). For example, after the memory controller 116 is initialized at block 426 via the pre-EFI initialization process, the memory controller 116 can expose an NVMe interface to provide the CPU 116 with access to the NVDSSM memory 106. The example resumer 304 determines whether the fast/enhanced low-power suspend flag 222 is set (block 430). For example, the resumer 304 can read the fast/enhanced low-power suspend flag 222 from the system partition 210 of the NVDSSM memory 106. If the fast/enhanced low-power suspend flag 222 is not set, the processor platform 100 launches the target OS 108 using prior resume techniques (block 432). For example, the processor platform 100 resumes to an awake S0 state without using the OS loader 218 and the hiberfile 220 in the NVDSSM memory 106. However, if the fast/enhanced low-power suspend flag 222 is set, the example resume data interface 310 loads and launches the OS loader 218 from the NVDSSM memory 106 (block 434). For example, the OS loader 218 boots the OS 108 into a running state. In the illustrated example of FIG. 4, since the processor platform 100 is resuming from the fast/enhanced low-power suspend mode, the resume process skips a number of steps that are ordinarily part of prior techniques to resume from a prior low-power S4 suspend mode. For example, the resume process does not display a BIOS startup screen at which a user can select (e.g., by pressing function key F8) to enter a BIOS setup screen. In this manner, the resume process from the fast/enhanced low-power suspend mode of the illustrated example operates to get the OS loader 218 up and running and displaying a user interface screen (e.g., a login screen) as fast as possible to create a user-perception that the processor platform 100 is resuming from a low-power S3 standby mode. The resume data interface 310 sets the fast/enhanced low-power resume flag 224 of FIG. 2 (block 436). For example, the resume data interface 310 sets the fast/enhanced low-power resume flag 224 by writing it into the OS partition 212 of the NVDSSM memory 106 to notify the OS 108 that the resume process is to resume from the fast/enhanced low-power suspend mode. Since the BIOS/platform process 404 of the illustrated example of FIG. 4 sets the fast/enhanced low-power resume flag 224 outside the context of the OS 108, the fast/enhanced low-power resume flag 224 is not encrypted.

When the OS loader 218 is launched, the example OS process 402 resumes. In the OS process 402, the OS loader 218 confirms the fast/enhanced low-power resume flag 224 is set (block 438). For example, the OS loader 218 reads the fast/enhanced low-power resume flag 224 from the OS partition 212 of the NVDSSM memory 106. In this manner, the OS loader 218 confirms that it should restore the awake state memory pages 118 from the OS partition 212 of the NVDSSM memory 106. Although not shown in FIG. 4, if the fast/enhanced low-power resume flag 224 is not set, the OS loader 218 restores the OS and/or application(s) context using prior resume techniques.

In the illustrated example of FIG. 4, after the OS loader 218 confirms that the fast/enhanced low-power resume flag 224 is set, the OS loader 218 restores the awake state memory pages 118 (block 440). For example, the OS loader 218 restores state data of the OS and/or application(s) context of the OS 108 and the application(s) 110 from the suspend state memory pages 120 into the awake state memory pages 118 in the system memory 104 and/or the cache 114. Control then advances to block 406 at which the OS 108 is up and running in the awake S0 mode, and the example process of FIG. 4 ends.

Figure 5:
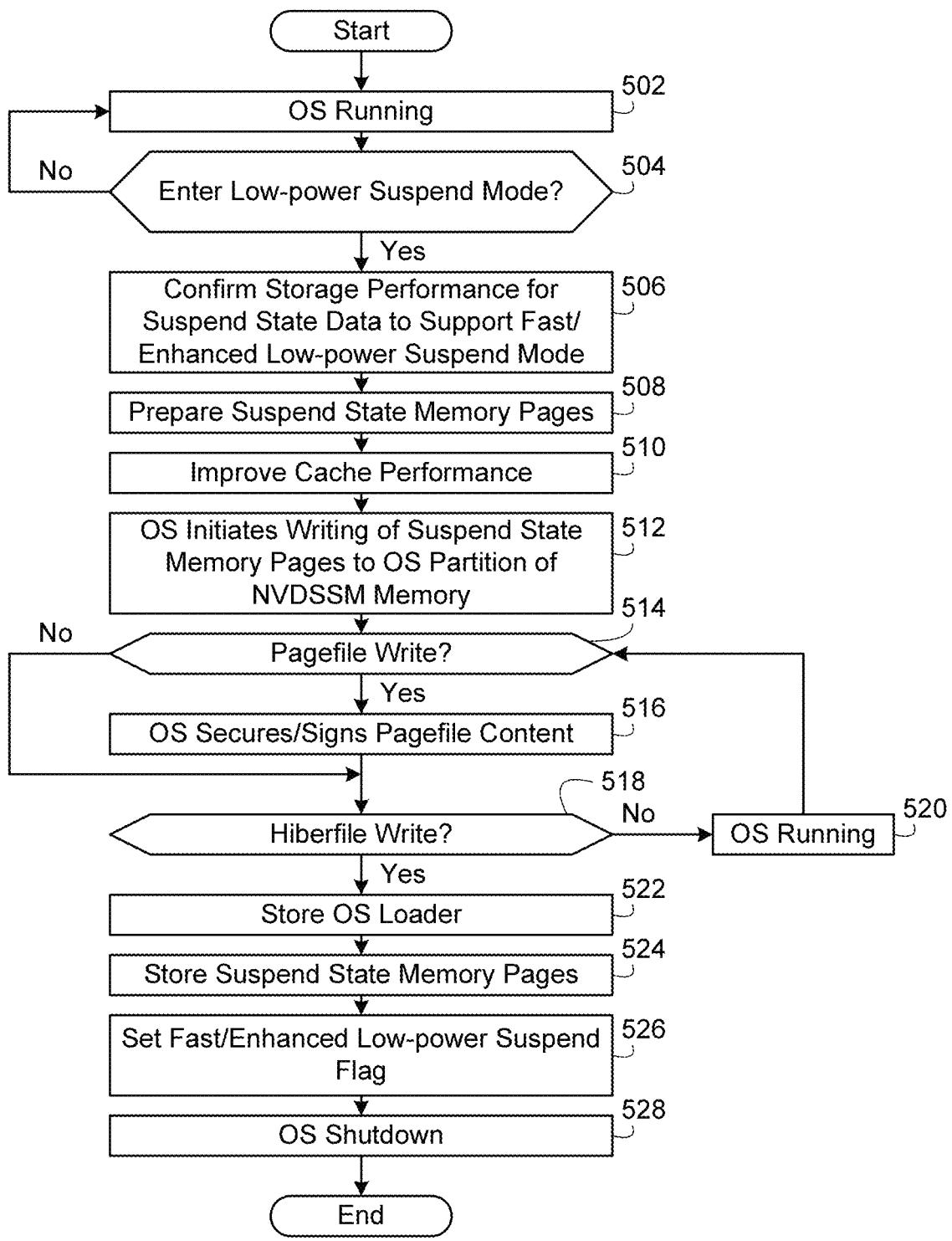
FIG. 5 is a flow diagram representative of example machine readable instructions that may be executed by a processor to perform suspend process in accordance with the teachings of this disclosure based on the OS and platform targeting a same low-power mode.

FIG. 5 is a flow diagram representative of example machine readable instructions that may be executed by the processor 102 to perform a suspend process based on the OS 108 and the processor platform 100 of FIG. 1 targeting a same low-power mode in accordance with the teachings of this disclosure. The example suspend process of FIG. 5 is executed by the OS 108 targeting to enter the fast/enhanced low-power S4 suspend mode. The program of FIG. 5 begins at block 502 at which the OS 108 is running. In the illustrated example of FIG. 5, the suspender 302 (FIG. 3) determines when the processor platform 100 is to enter a low-power suspend mode (block 504). For example, the suspender 302 can monitor for low-power suspend mode requests to enter into a low-power S4 suspend mode. In the illustrated example of FIG. 5, when the suspender 302 determines that a low-power suspend mode has not been requested, the OS 108 continues running. However, when the example suspender 302 determines at block 504 that a low-power suspend mode has been requested, control advances to block 506.

At block 506, the example capabilities tester 306 confirms the storage performance of the processor platform 100 for storing suspend state data to support fast/enhanced low-power suspend mode. For example, the capabilities tester 306 can perform a number of reads to various places in non-volatile storage memory and comparing data access times to an access time threshold as discussed above in connection with FIG. 3 to confirm that the processor platform has the NVDSSM memory 106 to enable a fast/enhanced low-power S4 suspend mode. Although not shown in FIG. 5, in some examples (such as described at blocks 410 and 412 of FIG. 4) the example capabilities tester 306 may determine at block 504 that the suspend state storage performance of the processor platform 100 does not indicate a presence of the NVDSSM memory 106. In such examples, the processor 102 enters into a traditional low-power suspend mode using a prior low-power suspend process (e.g., as described above in connection with block 414).

At block 508, the suspend data interface 308 (FIG. 3) prepares the suspend state memory pages 120 (FIGS. 1 and 2). For example, the suspend data interface 308 of FIG. 3 initiates a deep flush of the awake state memory pages 118 (FIG. 1) that involves deleting unnecessary standby pages from the system memory 104, writing modified data back to non-volatile memory from modified pages, and saving active and standby pages that are needed to save the state of OS and/or application context into the suspend state memory pages 120. In the illustrated example, the deep flush of the awake state memory pages 118 decreases the amount of data needed to store the suspend state data (e.g., OS and/or application context). As such, the deep flush of the awake state memory pages 118 decreases the size of the hiberfile 220 (FIG. 2), which will store the suspend state data (e.g., OS and/or application context) as part of the suspend state memory pages 120. In this manner, space requirements for storing the hiberfile 220 in the OS partition 212 (FIG. 2) of the NVDSSM 106 can be decreased. At block 510, the suspend data interface 308 handles improving of cache performance. For example, the suspend data interface 308 may employ an RST driver to flush the cache 114 (FIG. 1) and accelerate OS-level runtime operations by supplementing the system memory 104 in preparation for writing the suspend state memory pages 120 to save OS and/or application context.

The OS 108 initiates writing of the suspend state memory pages 120 to the OS partition 212 (FIG. 2) of the NVDSSM memory 106 (block 512). For example, the OS 108 can employ the suspend data interface 308 to write the suspend state memory pages 120 to the OS partition 212 to save the OS and/or application(s) context during the fast/enhanced low-power S4 suspend mode. In the illustrated example of FIG. 5, when pagefile writing is being performed (block 514) to generate the suspend state memory pages 120, the OS 108 secures and signs the pagefile content of the suspend state memory pages 120 (block 516). For example, the OS 108 may employ the suspend data interface 308 to secure and sign of the suspend state memory pages 120 to enhance the security of the OS and/or application context during the fast/enhanced low-power S4 suspend mode and during a resume process to resume from the fast/enhanced low-power S4 suspend mode.

When there is no pagefile writing activity (block 514), the OS 108 determines whether to perform a hiberfile write (block 518). For example, a hiberfile write of the hiberfile 220 to the OS partition 212 (FIG. 2) may be performed when the suspend data interface 308 determines that the suspend state memory pages 120 are ready for writing (e.g., they have been generated, secured, and signed). When the OS 108 determines at block 518 to not yet perform a hiberfile write, the OS 108 continues running (block 520), and control returns to block 514. When the OS 108 determines at block 518 to perform a hiberfile write, control advances to block 522 at which the example suspend data interface 308 stores the OS loader 218 (FIG. 2). For example, the suspend data interface 308 writes the OS loader 218 to the system partition 210 of the suspend/resume store 202 (FIG. 2) in the NVDSSM memory 106 to enable a fast/enhanced low-power S4 suspend mode. At block 524, the example suspend data interface 308 stores the suspend state memory pages 120. For example, the suspend data interface 308 writes the suspend state memory pages 120 as the hiberfile 220 to the OS partition 212 (FIG. 2) in the NVDSSM memory 106 to enable the fast/enhanced low-power S4 suspend mode.

In the illustrated example of FIG. 5, the suspend data interface 308 sets the fast/enhanced low-power suspend flag 222 of FIG. 2 (block 526). For example, the suspend data interface 308 can write the fast/enhanced low-power suspend flag 222 to the system partition 210 to indicate or signal the fast/enhanced low-power S4 suspend mode to the processor platform 100. The fast/enhanced low-power suspend flag 222 is written in the system partition 210 without encryption so that upon resume the processor 102 can access the flag 222 to determine whether to resume from a traditional low-power suspend mode or the fast/enhanced low-power suspend mode. The OS 108 shuts down (block 528). At this point, the OS 108 is in the fast/enhanced low-power suspend mode. The example process of FIG. 5 then ends.

Figure 6:
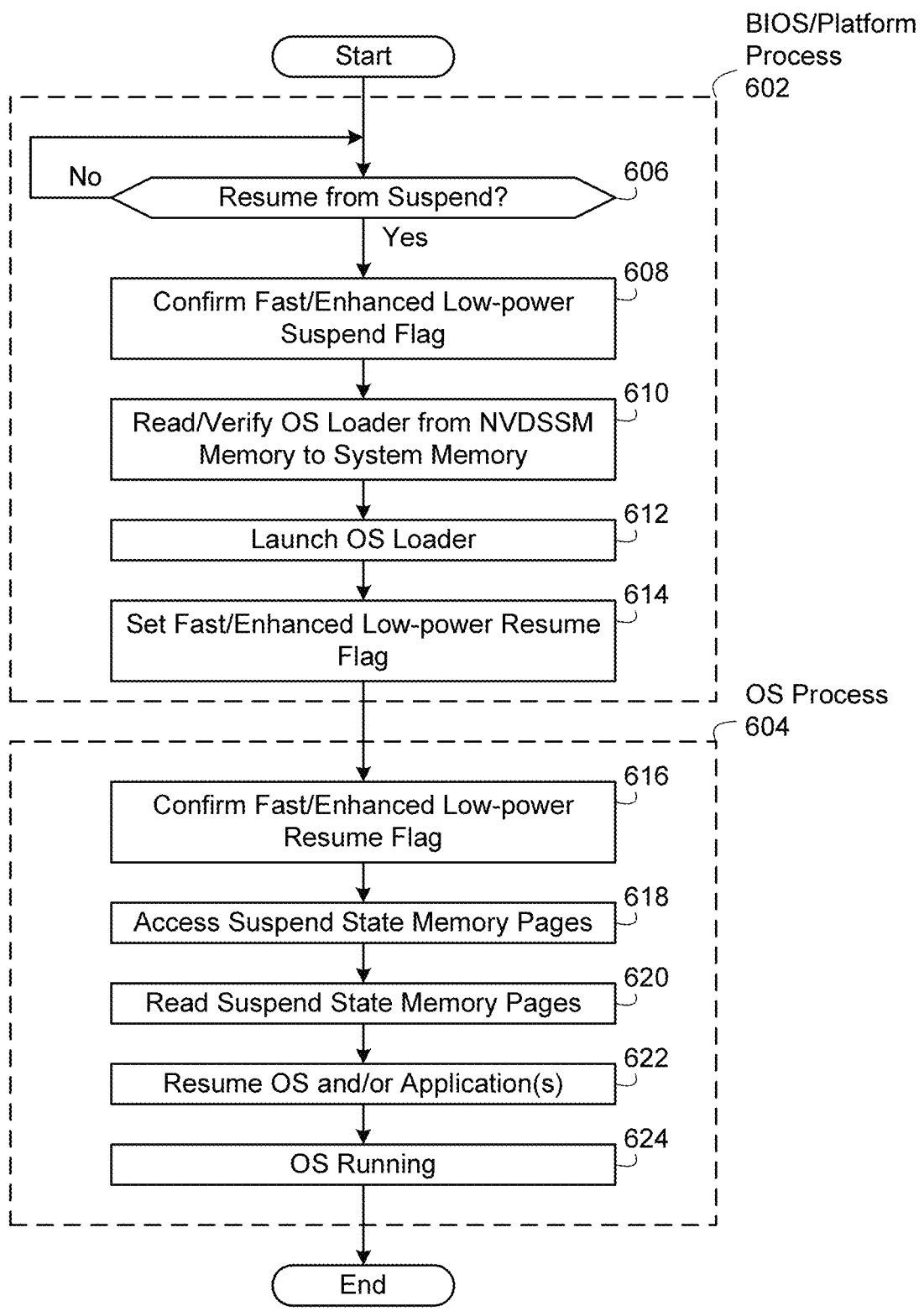
FIG. 6 is a flow diagram representative of example machine readable instructions that may be executed by a processor to perform another resume process in accordance with the teachings of this disclosure after entering a low-power mode using the suspend process of FIG. 5.

FIG. 6 is a flow diagram representative of example machine readable instructions that may be executed by the processor 102 (FIG. 1) to perform another resume process in accordance with the teachings of this disclosure after entering a low-power mode using the suspend process of FIG. 5. The flowchart of FIG. 6 shows two example processes that include an example BIOS/platform process 602 and an example OS process 604. In the illustrated example of FIG. 6, the BIOS/platform process 602 is performed by the processor 102 of FIG. 1 (e.g., using firmware instructions in the BIOS 122 of FIG. 1 outside the context of the OS 108), and the OS process 604 is performed by the OS 108 of FIG. 1 (e.g., OS processes executed by the processor 102). In the example of FIG. 6, components of the apparatus 300 that operate in the OS process 604 are implemented by the OS 108 as computer readable instructions executed by the processor 102. Additionally, components of the apparatus 300 that operate in the BIOS/platform process 602 are implemented using logic circuits of the processor 102 and/or by firmware computer readable instructions (e.g., in the BIOS 122) executed by the processor 102.

Turning to the BIOS/platform process 602, at block 606 the example resumer 304 (FIG. 3) determines whether to resume from suspend. For example, the resumer 304 determines whether it has detected a resume request to resume from the fast/enhanced low-power suspend mode of the example suspend process of FIG. 5. If the resumer 304 determines at block 606 to not resume, the processor platform 100 remains in the fast/enhanced low-power suspend mode. When the resumer 304 determines at block 606 to resume, control advances to block 608 at which the example resumer 304 confirms that the fast/enhanced low-power suspend flag 222 is set. For example, the resumer 304 can read the fast/enhanced low-power suspend flag 222 from the system partition 210 of the NVDSSM memory 106. Although not shown in FIG. 6, if the fast/enhanced low-power suspend flag 222 is not set, the processor platform 100 launches the target OS 108 using prior resume techniques (e.g., as described above in connection with lock 430 of FIG. 4).

At block 610 the example resume data interface 310 reads and verifies the OS loader 218 from the NVDSSM memory 106 to the system memory 104 (FIG. 1). For example, the resume data interface 310 can verify the integrity of the OS loader 218 using checksums, parity bits, and/or any other suitable technique to ensure the OS loader 218 is not corrupt. The example resume data interface 310 launches the OS loader 218 from the NVDSSM memory 106 (block 612). For example, the OS loader 218 boots the OS 108 into a running state. In the illustrated example of FIG. 6, since the processor platform 100 is resuming from the fast/enhanced low-power suspend mode, the resume process skips a number of steps that are ordinarily part of prior techniques to resume from a prior low-power S4 suspend mode. For example, the resume process does not display a BIOS startup screen at which a user can select (e.g., by pressing function key F8) to enter a BIOS setup screen. In this manner, the resume process from the fast/enhanced low-power suspend mode of the illustrated example of FIG. 6 operates to get the OS loader 218 up and running and displaying a user interface screen (e.g., a login screen) as fast as possible to create a user-perception that the processor platform 100 is resuming from a low-power S3 standby mode. The resume data interface 310 sets the fast/enhanced low-power resume flag 224 of FIG. 2 (block 614). For example, the resume data interface 310 sets the fast/enhanced low-power resume flag 224 by writing it into the OS partition 212 of the NVDSSM memory 106 to notify the OS 108 that the resume process is to resume from the fast/enhanced low-power suspend mode. Since the BIOS/platform process 602 of the illustrated example sets the fast/enhanced low-power resume flag 224 outside the context of the OS 108, the fast/enhanced low-power resume flag 224 is not encrypted.

Control is passed to the example OS process 604. The OS loader 218 confirms the fast/enhanced low-power resume flag 224 is set (block 616). For example, the OS loader 218 reads the fast/enhanced low-power resume flag 224 from the OS partition 212 of the NVDSSM memory 106. In this manner, the OS loader 218 confirms that it should restore the awake state memory pages 118 from the OS partition 212 of the NVDSSM memory 106. Although not shown in FIG. 6, if the fast/enhanced low-power resume flag 224 is not set, the OS loader 218 restores the OS and/or applications context using prior resume techniques. The OS loader 218 accesses the suspend state memory pages 120 in the NVDSSM memory 106 (block 618). For example, the BIOS 122 of the processor platform 100 exposes an early block interface to the NVDSSM memory 106 so that the OS 108 can read the suspend state memory pages 120 in the hiberfile 220 from the NVDSSM memory 106. Alternatively, in some examples, the OS loader 218 is provided with sufficient information on the data and address organization of the NVDSSM memory 106 to access the hiberfile 220 without an early block interface from the BIOS 122.

The OS loader 218 reads the suspend state memory pages 120 (block 620) from, for example, the hiberfile 220. The OS loader 218 resumes the OS 108 and/or the application(s) 110 (block 622). For example, the OS loader 218 restores the OS and application(s) context from the suspend state memory pages 120 to the awake state memory pages 118, and resumes execution of the OS 108 and/or the application(s) 110 based on the restored OS and application(s) context. In the illustrated example of FIG. 6, the OS 108 is up and running (block 624). The example process of FIG. 6 then ends.

Figure 7:
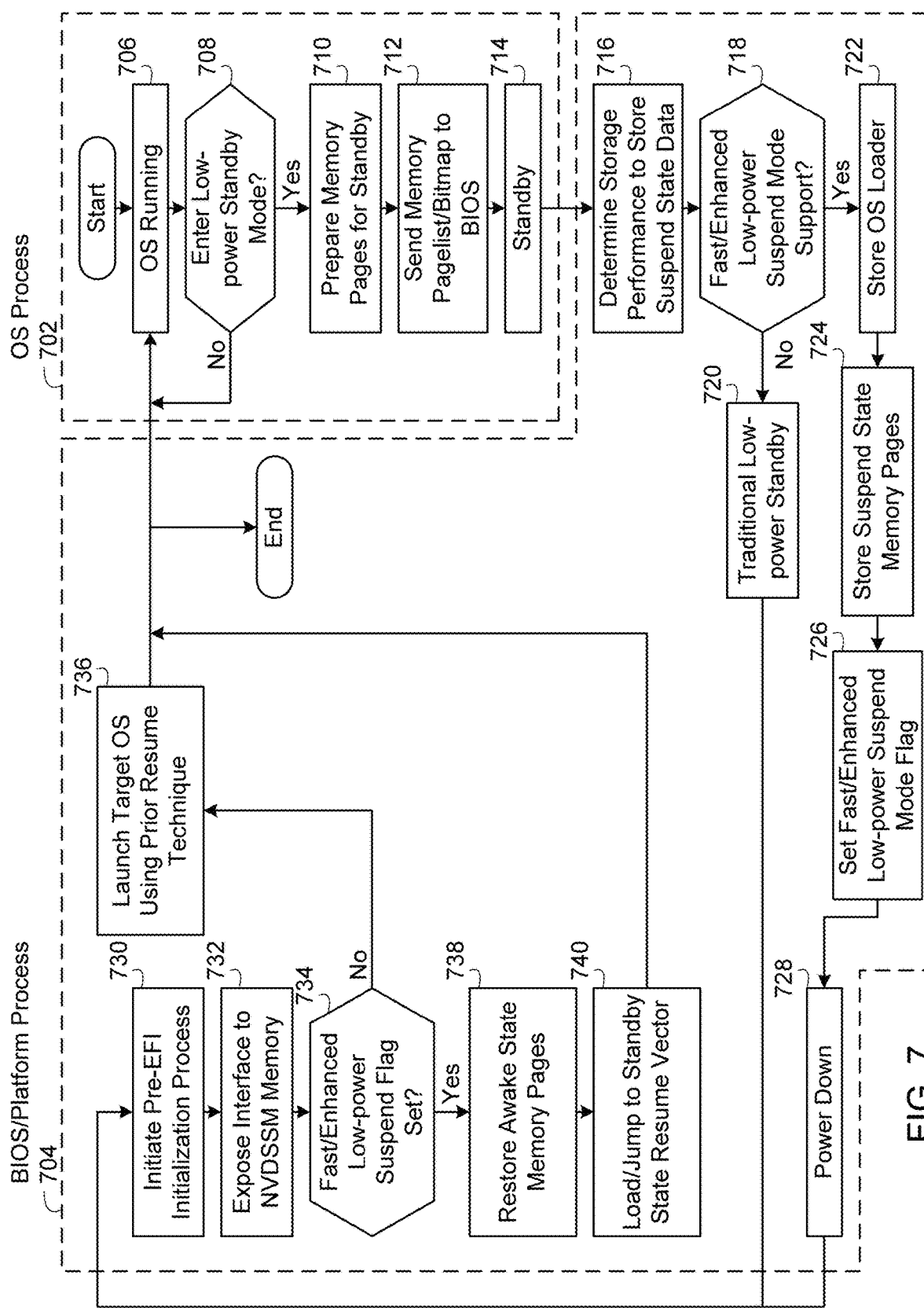
FIG. 7 is a flow diagram representative of example machine readable instructions that may be executed by a processor to perform suspend and resume processes in accordance with the teachings of this disclosure based on the OS and platform targeting different low-power modes.

FIG. 7 is a flow diagram representative of example machine readable instructions that may be executed by a processor to perform suspend and resume processes in accordance with the teachings of this disclosure based on the OS and platform targeting different low-power modes. The example process of FIG. 7 involves the OS 108 targeting to enter a low-power S3 standby mode and the processor platform 100 targeting to enter the fast/enhanced low-power S4 suspend mode (which is different from the low-power S3 standby mode). The example process of FIG. 7 is useful for use with OSs that do not have the native ability to enter a low-power S4 suspend mode. That is, some OSs are capable to enter into the low-power S3 standby mode, but not into a suspended mode such as the low-power S4 suspend mode. As such, the example of FIG. 7 can be used to implement the fast/enhanced low-power S4 suspend mode in accordance with the teachings of this disclosure for computing devices running OSs that do not support a low-power S4 suspend mode.

The flowchart of FIG. 7 shows two example processes that include an example OS process 702 and an example BIOS/platform process 704. In the illustrated example of FIG. 7, the BIOS/platform process 704 is performed by the processor 102 of FIG. 1 (e.g., using firmware instructions in the BIOS 122 of FIG. 1 outside the context of the OS 108), and the OS process 702 is performed by the OS 108 of FIG. 1 (e.g., OS instructions executed by the processor 102). In the example of FIG. 7, components of the apparatus 300 that operate in the OS process 702 are implemented by the OS 108 as computer readable instructions executed by the processor 102. Additionally, components of the apparatus 300 that operate in the BIOS/platform process 704 are implemented using logic circuits of the processor 102 and/or by firmware computer readable instructions (e.g., in the BIOS 122) executed by the processor 102.

The example OS process 702 of FIG. 7 begins at block 706 at which the OS 108 is running. In the illustrated example of FIG. 7, the OS 108 determines when the processor platform 100 is to enter a low-power standby mode (block 708). For example, the OS 108 can monitor for low-power standby mode requests to enter into a low-power S3 standby mode. In the illustrated example of FIG. 7, when the OS 108 determines that a low-power standby mode has not been requested, the OS 108 continues running. However, when the example OS 108 determines at block 708 that a low-power standby mode has been requested, control advances to block 710. At block 710, the OS 108 prepares the awake state memory pages 118 (FIG. 1) for standby mode. For example, the OS 108 initiates a deep flush of the awake state memory pages 118 that involves deleting unnecessary standby pages from the system memory 104, writing modified data back to non-volatile memory from modified pages, and saving active and standby pages that are needed to save the state of OS and/or application context into the suspend state memory pages 120. In the illustrated example, the deep flush of the awake state memory pages 118 decreases the amount of data needed to store the suspend state data (e.g., OS and/or application context). As such, the deep flush of the awake state memory pages 118 decreases the size of the hiberfile 220 (FIG. 2), which will store the suspend state data (e.g., OS and/or application context) as part of the suspend state memory pages 120. In this manner, space requirements for storing the hiberfile 220 in the NVDSSM 106 can be decreased. As part of preparing the awake state memory pages 118 for standby mode, the OS 108 stores a standby state resume vector (e.g., an S3 resume vector corresponding to a low-power S3 standby mode) in the awake state memory pages 118. The standby state resume vector enables waking up to a memory location storing the OS and application(s) context as it existed before entering into the low-power standby mode. The awake state memory pages 118 remain stored in the system memory 104 because the OS 108 is targeting to enter into a standby mode in which the OS 108 expects that the system memory 104 will remain powered to persist data. At block 712, the example OS 108 sends a memory pagelist/bitmap to the BIOS 122 (FIG. 1). In the illustrated example of FIG. 7, the memory pagelist/bitmap provides physical address locations of the awake state memory pages 118 at which the BIOS 122 can access them in the system memory 104. In this manner, during the BIOS/platform phase 704, the BIOS 122 can copy state data from the awake state memory pages 118 in the system memory 104 to the suspend state memory pages 120 in the NVDSSM memory 106. The OS 108 then enters into low-power standby mode (block 714). At this point, the OS 108 behaves as if the computing device on which it runs will remain in low-power standby mode until a resume process. However, when control advances to the BIOS/platform process 704, the processor platform 100 takes over the low-power mode process to transition into the fast/enhanced low-power suspend mode.

Turning now to the BIOS/platform process 704, at block 716, the example capabilities tester 306 determines the storage performance of the processor platform 100 for storing suspend state data (e.g., OS and/or application context). For example, the capabilities tester 306 can perform a number of reads to various places in non-volatile storage memory and comparing data access times to an access time threshold as discussed above to determine whether the processor platform has the NVDSSM memory 106 to support a fast/enhanced low-power suspend mode. When the example capabilities tester 306 determines at block 718 that the suspend state storage performance of the processor platform 100 does not support fast/enhanced low-power suspend mode (e.g., the NVDSSM memory 106 is not present), the processor 102 remains in a traditional low-power standby mode using a prior low-power standby process (block 720).

When the example capabilities tester 306 determines at block 718 that the suspend state storage performance of the processor platform 100 supports the fast/enhanced low-power suspend mode (e.g., the NVDSSM memory 106 is present), control advances to block 722. At block 722, the example suspend data interface 308 stores the OS loader 218 (FIG. 2). For example, the suspend data interface 308 uses the pagelist/bitmap provided at block 712 during the OS process 702 to copy the OS loader 218 from the system memory 104 to the system partition 210 of the suspend/resume store 202 (FIG. 2) in the NVDSSM memory 106 to enable the fast/enhanced low-power S4 suspend mode. At block 724, the example suspend data interface 308 stores the suspend state memory pages 120. For example, the suspend data interface 308 stores the suspend state memory pages 120 in the system partition 210 of the NVDSSM memory 106 to enable the fast/enhanced low-power S4 suspend mode after using the pagelist/bitmap (e.g., provided at block 712 during the OS process 702) to copy state data from the awake state memory pages 118 in the system memory 104 to the suspend state memory pages 120. In the illustrated example of FIG. 7, the suspend data interface 308 stores the suspend state memory pages 120 to the system partition 210 because the processor platform 100 does not have access to the OS partition 212 of the NVDSSM memory 106 outside the context of the OS 108.

In the illustrated example of FIG. 7, the suspend data interface 308 also sets the fast/enhanced low-power suspend flag 222 of FIG. 2 (block 726). For example, the suspend data interface 308 can write the fast/enhanced low-power suspend flag 222 to the system partition 210 to indicate or signal the fast/enhanced low-power S4 suspend mode to the processor platform 100. The fast/enhanced low-power suspend flag 222 is written in the system partition 210 without encryption so that upon resume the processor 102 can access the flag 222 to determine whether to resume from a traditional low-power suspend mode or the fast/enhanced low-power suspend mode.

The BIOS 122 powers down the processor platform 100 (block 728). For example, the BIOS 122 can instruct a power management unit of the processor platform 100 to turn off power to the processor platform 100. In the illustrated example of FIG. 7, if fast/enhanced low-power suspend mode is not supported, and a traditional low-power standby mode is used at block 720, the power down of block 728 is bypassed as shown in FIG. 7. In this manner, power to the system memory 104 is maintained so that the OS and/or application(s) context stored in the system memory 104 during the OS process 702 will be persisted during the standby mode.

After some time, the example resumer 304 detects a resume request. Following such resume request, control advances to block 730. At block 730, the resumer 304 initiates an example pre-EFI initialization process. In the illustrated example of FIG. 7, the pre-EFI initialization process discovers the boot mode to be used, launches modules that initialize main memory, and discovers and launches system firmware. In the illustrated example of FIG. 7, early hardware initialization performed as part of the pre-EFI initialization process includes initializing BIOS Memory Reference Code (MRC), which is used to initialize the memory controller 116 (FIG. 1) and optimize read/write timing and memory voltages for optimal memory performance.

The example memory controller 116 (FIG. 1) exposes a memory interface to the NVDSSM memory 106 (block 732). For example, after the memory controller 116 is initialized at block 730 via the pre-EFI initialization process, the memory controller 116 can expose an NVMe interface to provide the CPU 116 with access to the NVDSSM memory 106. The example resumer 304 determines whether the fast/enhanced low-power suspend flag 222 is set (block 734). If the fast/enhanced low-power suspend flag 222 is not set, the processor platform 100 resumes the target OS 108 using prior resume techniques (block 736). For example, the processor platform 100 resumes from the low-power S3 standby state to an awake S0 state without restoring the suspend state memory pages 120 from the NVDSSM memory 106. However, if the fast/enhanced low-power suspend flag 222 is set, the example resume data interface 310 restores the awake state memory pages 118 from the NVDSSM memory 106 (block 738). For example, the resume data interface 310 restores the OS and/or application(s) context of the OS 108 and the application(s) 110 from the suspend state memory pages 120 into the awake state memory pages 118 in the system memory 104 and/or the cache 114. The resume data interface 310 then loads (or jumps to) a standby state resume vector (block 740). For example, the resume data interface 310 loads (or jumps to) the standby state resume vector stored by the OS 108 at block 710 of the OS process 702. Control then advances to block 706 at which the OS 108 is up and running in the awake S0 mode, and the example process of FIG. 7 ends.

Figure 8:
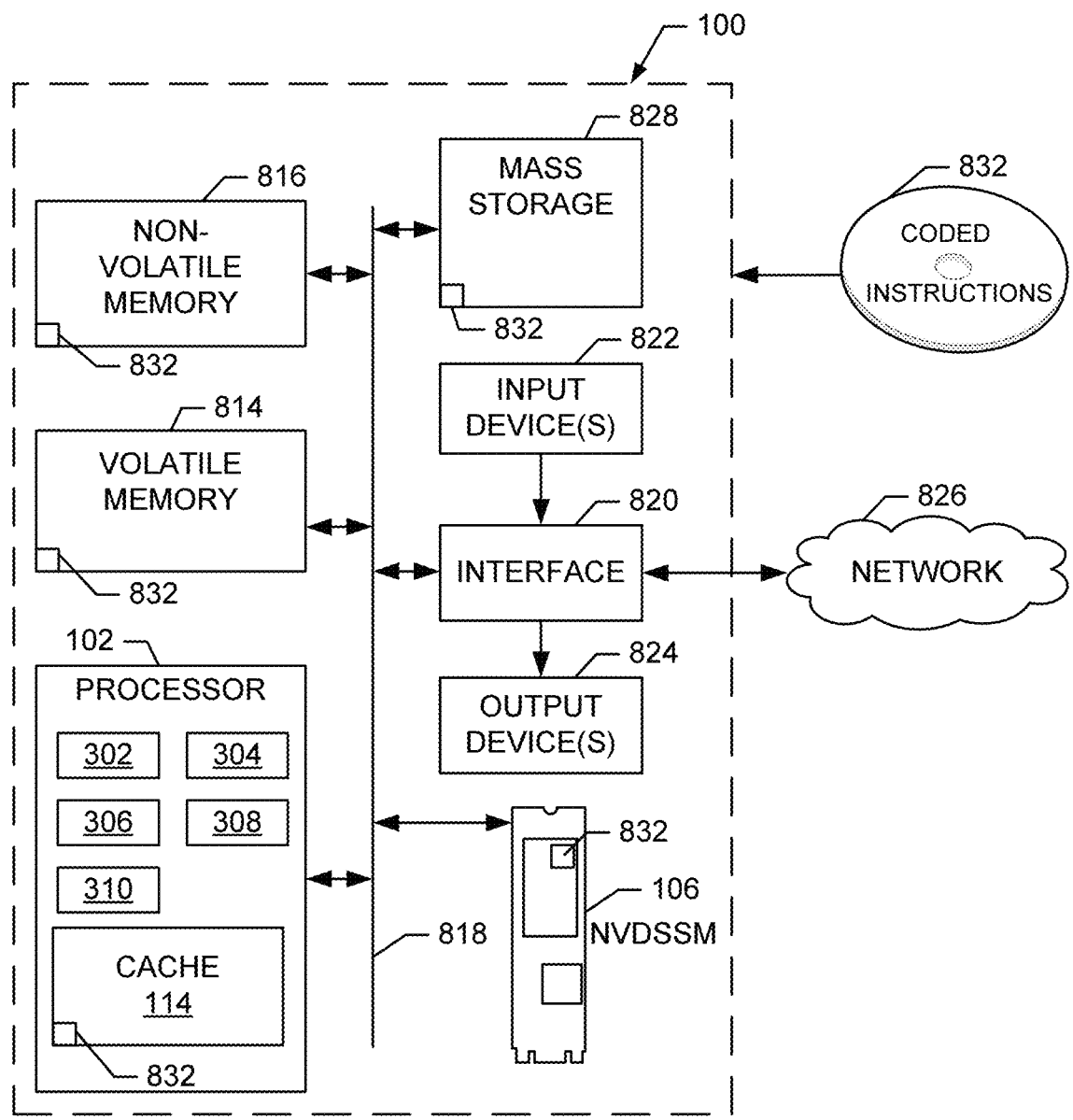
FIG. 8 is another example of the processor platform of FIG. 1 capable of executing the example computer readable instructions represented by FIGS. 4-7 to implement the example apparatus of FIG. 3 in accordance with teachings of this disclosure to suspend and resume the processor platform of FIGS. 1 and 8 in accordance with the teachings of this disclosure.

FIG. 8 is a block diagram of another example of the processor platform 100 of FIG. 1 capable of executing the instructions of FIGS. 4-7 to implement the apparatus 300 of FIG. 3. In the illustrated example of FIG. 8, some of the elements shown in FIG. 1 are omitted. However, the processor platform 100 can be implemented to include any of the elements shown in FIG. 1 and FIG. 8. The processor platform 100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 100 of the illustrated example includes the processor 102. The processor 102 of the illustrated example is hardware. For example, the processor 102 can be implemented by one or more integrated circuits, logic circuits, microprocessors or controllers from any desired family or manufacturer. In the illustrated example, the processor 102 implements the example suspender 302, the example resumer 304, the example capabilities tester 306, the example suspend data interface 308, and the example resume data interface 310 of the apparatus 300 of FIG. 3.

The processor 102 of the illustrated example includes the cache 114 of FIG. 1. The processor 102 of the illustrated example is in communication with a main memory including a volatile memory 814, a non-volatile memory 816, and the NVDSSM 106 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816, 106 is controlled by the memory controller 116 of FIG. 1.

The processor platform 100 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 100 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement the processes of FIGS. 4-7 may be stored in the mass storage device 828, in the volatile memory 814, in the non-volatile memory 816, in the NVDSSM 106, and/or on a removable tangible computer readable storage medium such as a CD or DVD.

From the foregoing, it will be appreciated that the above disclosed methods, apparatus and articles of manufacture enable more energy efficient computing devices through low-power suspend modes while meeting consumer expectations of fast resume/wakeup times. In some examples, by using handshaking processes between an OS and a platform through the passing of suspend and resume flags, the OS and the platform can work cooperatively in a hybridized manner to perform respective operations targeting to enter a fast/enhanced low-power suspend mode. Since such fast/enhanced low-power suspend mode is implemented using NVDSSM memory as disclosed herein, the non-volatile characteristic of the NVDSSM memory enables removing power from the platform without losing OS and/or application context. In addition, the fast, bit-level data access characteristics of NVDSSM memory are useful to create a user perception of a substantially instant-on performance of computing devices when resuming from the fast/enhanced low-power suspend mode as disclosed herein. As such, although users traditionally avoid using the low-power S4 suspend mode of prior computing devices because of the long delay associated with resuming from suspend, users will be more likely to use the fast/enhanced low-power suspend mode disclosed herein because it enables a device to have substantially faster resume times that are the same or similar to resume times of a low-power S3 standby mode. In addition, users will be more likely to use the fast/enhanced low-power suspend mode because it improves power performance of computing devices by lowering the power consumption when in the fast/enhanced low-power suspend mode than is achievable using the low-power S3 standby mode.

The following pertain to further examples disclosed herein.

Example 1 is a method to suspend and resume a device. The method of Example 1 includes: after detecting a low-power suspend mode request, determining, by executing an instruction with a processor, a storage performance of the device to store suspend state data; based on the storage performance of the device, setting a suspend flag, by executing an instruction with the processor, to indicate a low-power suspend mode to a processor platform; when resuming from the low-power suspend mode, confirming, by executing an instruction with the processor, a setting of a resume flag from the processor platform, the resume flag to notify an operating system to resume from the low-power suspend mode; and when the resume flag is set, restoring, by executing an instruction with the processor, state data corresponding to an operating system context from a non-volatile dual-purpose system and storage memory.

In Example 2, the subject matter of Example 1 can optionally include that the non-volatile dual-purpose system and storage memory is capable of storing non-volatile data and providing bit-level and random access to the non-volatile data at data transfer rates of at least 1.5 gigabytes per second.

In Example 3, the subject matter of any one of Examples 1-2 can optionally include that the non-volatile dual-purpose system and storage memory includes a system partition and an operating system partition, the setting of the suspend flag including writing the suspend flag to the system partition.

In Example 4, the subject matter of any one of Examples 1-3 can optionally include that the confirming of the setting of the resume flag includes reading the resume flag from the operating system partition.

In Example 5, the subject matter of any one of Examples 1-4 can optionally include that the non-volatile dual-purpose system and storage memory includes a system partition and an operating system partition, and can optionally further include, when entering the low-power suspend mode, storing an operating system loader in the system partition, and storing the state data in the operating system partition.

In Example 6, the subject matter of any one of Examples 1-5 can optionally include resuming from the low-power suspend mode without displaying a basic input/output system (BIOS) startup screen at which a user can select to enter a BIOS setup screen.

Example 7 is an apparatus to suspend and resume a device. The apparatus of Example 7 includes: a capabilities tester to, after detecting a low-power suspend mode request, determine a storage performance of the device to store suspend state data; a suspend data interface to, based on the storage performance of the device, set a suspend flag to indicate a low-power suspend mode to a processor platform; and an operating system loader to: when resuming from the low-power suspend mode, confirm a setting of a resume flag from the processor platform, the resume flag to notify an operating system to resume from the low-power suspend mode; and when the resume flag is set, restore state data corresponding to an operating system context from a non-volatile dual-purpose system and storage memory.

In Example 8, the subject matter of Example 7 can optionally include that the non-volatile dual-purpose system and storage memory is capable of storing non-volatile data and providing bit-level and random access to the non-volatile data at data transfer rates of at least 1.5 gigabytes per second.

In Example 9, the subject matter of any one of Examples 7-8 can optionally include that the non-volatile dual-purpose system and storage memory includes a system partition and an operating system partition, the suspend data interface to set the suspend flag by writing the suspend flag to the system partition.

In Example 10, the subject matter of any one of Examples 7-9 can optionally include that the operating system loader is to confirm the setting of the resume flag by reading the resume flag from the operating system partition.

In Example 11, the subject matter of any one of Examples 7-10 can optionally include that the non-volatile dual-purpose system and storage memory includes a system partition and an operating system partition, and when entering the low-power suspend mode, the suspend data interface is further to store the operating system loader in the system partition, and to store the state data in the operating system partition.

In Example 12, the subject matter of any one of Examples 7-11 can optionally include that the resuming from the low-power suspend mode includes resuming from the low-power suspend mode without displaying a basic input/output system (BIOS) startup screen at which a user can select to enter a BIOS setup screen.

Example 13 is at least one article of manufacture including machine readable instructions that, when executed, cause a processor to at least after detecting a low-power suspend mode request, determine a storage performance of the device to store suspend state data; based on the storage performance of the device, set a suspend flag to indicate a low-power suspend mode to a processor platform; when resuming from the low-power suspend mode, confirm a setting of a resume flag from the processor platform, the resume flag to notify an operating system to resume from the low-power suspend mode; and when the resume flag is set, restore state data corresponding to an operating system context from a non-volatile dual-purpose system and storage memory.

In Example 14, the subject matter of Example 13 can optionally include that the non-volatile dual-purpose system and storage memory is capable of storing non-volatile data and providing bit-level and random access to the non-volatile data at data transfer rates of at least 1.5 gigabytes per second.

In Example 15, the subject matter of any one of Examples 13-14 can optionally include that the non-volatile dual-purpose system and storage memory includes a system partition and an operating system partition, the instructions to cause the processor to set the suspend flag by writing the suspend flag to the system partition.

In Example 16, the subject matter of any one of Examples 13-15 can optionally include that the instructions are to cause the processor to confirm the setting of the resume flag by reading the resume flag from the operating system partition.

In Example 17, the subject matter of any one of Examples 13-16 can optionally include that the non-volatile dual-purpose system and storage memory includes a system partition and an operating system partition, the instructions further to cause the processor to, when entering the low-power suspend mode, store an operating system loader in the system partition, and store the state data in the operating system partition.

In Example 18, the subject matter of any one of Examples 13-17 can optionally include that the instructions are further to cause the processor to resume from the low-power suspend mode without displaying a basic input/output system (BIOS) startup screen at which a user can select to enter a BIOS setup screen.

Example 19 is a method to resume a device. The method of Example 19 includes: initializing, by executing an instruction with a processor, a memory interface to a non-volatile dual-purpose system and storage memory that operates as a non-volatile storage memory and as a system memory having bit-level, random access memory capabilities; determining, by executing an instruction with the processor, a setting of a suspend flag, the suspend flag to indicate a low-power suspend mode to a processor platform; launching, by executing an instruction with the processor, an operating system loader loaded from the non-volatile dual-purpose system and storage memory; and setting, by executing an instruction with the processor, a resume flag to notify an operating system to resume from the low-power suspend mode.

In Example 20, the subject matter of Example 19 can optionally include that the non-volatile dual-purpose system and storage memory is capable of storing non-volatile data and providing bit-level and random access to the non-volatile data at data transfer rates of at least 1.5 gigabytes per second.

In Example 21, the subject matter of any one of Examples 19-20 can optionally include that the non-volatile dual-purpose system and storage memory includes a system partition and an operating system partition, the determining of the setting of the suspend flag including reading the suspend flag from the system partition.

In Example 22, the subject matter of any one of Examples 19-21 can optionally include that the setting of the resume flag includes writing the resume flag to the operating system partition.

In Example 23, the subject matter of any one of Examples 19-22 can optionally include that the non-volatile dual-purpose system and storage memory includes a system partition and an operating system partition, and can further optionally include loading the operating system loader from the operating system partition.

In Example 24, the subject matter of any one of Examples 19-23 can optionally include resuming from the low-power suspend mode without displaying a basic input/output system (BIOS) startup screen at which a user can select to enter a BIOS setup screen.

Example 25 is an apparatus to resume a device. The apparatus of Example 25 includes: a memory controller to initialize a memory interface to a non-volatile dual-purpose system and storage memory that operates as a non-volatile storage memory and as a system memory having bit-level, random access memory capabilities; a resumer to determine a setting of a suspend flag, the suspend flag to indicate a low-power suspend mode to a processor platform; and a resume data interface to: launch an operating system loader loaded from the non-volatile dual-purpose system and storage memory; and set a resume flag to notify an operating system to resume from the low-power suspend mode.

In Example 26, the subject matter of Example 25 can optionally include that the non-volatile dual-purpose system and storage memory is capable of storing non-volatile data and providing bit-level and random access to the non-volatile data at data transfer rates of at least 1.5 gigabytes per second.

In Example 27, the subject matter of any one of Examples 25-26 can optionally include that the non-volatile dual-purpose system and storage memory includes a system partition and an operating system partition, the resumer to determine the setting of the suspend flag by reading the suspend flag from the system partition.

In Example 28, the subject matter of any one of Examples 25-27 can optionally include that the resume data interface is to set the resume flag by writing the resume flag to the operating system partition.

In Example 29, the subject matter of any one of Examples 25-28 can optionally include that the non-volatile dual-purpose system and storage memory includes a system partition and an operating system partition, the resume data interface further to load the operating system loader from the operating system partition.

In Example 30, the subject matter of any one of Examples 25-29 can optionally include the operating system loader is to boot the operating system to resume from the low-power suspend mode without displaying a basic input/output system (BIOS) startup screen at which a user can select to enter a BIOS setup screen.

Example 31 is at least one article of manufacture including machine readable instructions that, when executed, cause a processor to at least initialize a memory interface to a non-volatile dual-purpose system and storage memory that operates as a non-volatile storage memory and as a system memory having bit-level, random access memory capabilities; determine a setting of a suspend flag, the suspend flag to indicate a low-power suspend mode to a processor platform; launch an operating system loader loaded from the non-volatile dual-purpose system and storage memory; and set a resume flag to notify an operating system to resume from the low-power suspend mode.

In Example 32, the subject matter of Example 31 can optionally include that the non-volatile dual-purpose system and storage memory is capable of storing non-volatile data and providing bit-level and random access to the non-volatile data at data transfer rates of at least 1.5 gigabytes per second.

In Example 33, the subject matter of any one of Examples 31-32 can optionally include that the non-volatile dual-purpose system and storage memory includes a system partition and an operating system partition, the instructions to cause the processor to determine the setting of the suspend flag by reading the suspend flag from the system partition.

In Example 34, the subject matter of any one of Examples 31-33 can optionally include that the instructions cause the processor to set the resume flag by writing the resume flag to the operating system partition.

In Example 35, the subject matter of any one of Examples 31-34 can optionally include that the non-volatile dual-purpose system and storage memory includes a system partition and an operating system partition, the instructions further to cause the processor to load the operating system loader from the operating system partition.

In Example 36, the subject matter of any one of Examples 31-35 can optionally include that the instructions are further to cause the processor to resume from the low-power suspend mode without displaying a basic input/output system (BIOS) startup screen at which a user can select to enter a BIOS setup screen.

Example 37 is a method to suspend and resume a device. The method of Example 37 includes: after an operating system enters a low-power standby mode, determining, by executing an instruction with a processor, a storage performance of the device to store suspend state data; setting, by executing an instruction with the processor, a suspend flag based on the storage performance of the device, the suspend flag to indicate a low-power suspend mode; and after detecting a resume request, confirming, by executing an instruction with the processor, the setting of the suspend flag and loading a standby state resume vector to resume from the low-power suspend mode.

In Example 38, the subject matter of Example 37 can optionally include that the standby state resume vector corresponds to a low-power standby mode that is different from the low-power suspend mode.

In Example 39, the subject matter of any one of Examples 37-38 can optionally include determining a presence of a non-volatile dual-purpose system and storage memory based on the storage performance satisfying an access time threshold.

In Example 40, the subject matter of any one of Examples 37-39 can optionally include that the setting of the suspend flag based on the storage performance of the device includes setting the suspend flag based on determining the presence of the non-volatile dual-purpose system and storage memory.

In Example 41, the subject matter of any one of Examples 37-40 can optionally include that the non-volatile dual-purpose system and storage memory is to operate as a non-volatile storage memory and as a system memory having bit-level, random access memory capabilities to access data at data transfer rates of at least 1.5 gigabytes per second.

In Example 42, the subject matter of any one of Examples 37-41 can optionally include that the non-volatile dual-purpose system and storage memory includes a system partition and an operating system partition, the setting of the suspend flag including writing the suspend flag to the system partition.

In Example 43, the subject matter of any one of Examples 37-42 can optionally include that the non-volatile dual-purpose system and storage memory includes a system partition and an operating system partition, and can optionally include, when entering the low-power suspend mode, storing an operating system loader and state data in the system partition, the state data including a context of an operating system.

In Example 44, the subject matter of any one of Examples 37-43 can optionally include resuming from the low-power suspend mode without displaying a basic input/output system (BIOS) startup screen at which a user can select to enter a BIOS setup screen.

Example 45 is an apparatus to suspend and resume a device. The apparatus of Example 45 includes: a capabilities tester to, after an operating system enters a low-power standby mode, determine a storage performance of the device to store suspend state data; a suspend data interface to set a suspend flag based on the storage performance of the device, the suspend flag to indicate a low-power suspend mode; a resumer to, after detecting a resume request, confirm the setting of the suspend flag; and a resume data interface to load a standby state resume vector to resume from the low-power suspend mode.

In Example 46, the subject matter of Example 45 can optionally include that the standby state resume vector corresponds to a low-power standby mode that is different from the low-power suspend mode.

In Example 47, the subject matter of any one of Examples 45-46 can optionally include that the storage performance of the device is indicative of a presence of a non-volatile dual-purpose system and storage memory based on the storage performance satisfying an access time threshold.

In Example 48, the subject matter of any one of Examples 45-47 can optionally include that the suspend data interface is to set the suspend flag based on the storage performance of the device by setting the suspend flag based on the presence of the non-volatile dual-purpose system and storage memory.

In Example 49, the subject matter of any one of Examples 45-48 can optionally include that the non-volatile dual-purpose system and storage memory is to operate as a non-volatile storage memory and as a system memory having bit-level, random access memory capabilities to access data at data transfer rates of at least 1.5 gigabytes per second.

In Example 50, the subject matter of any one of Examples 45-49 can optionally include that the non-volatile dual-purpose system and storage memory includes a system partition and an operating system partition, the suspend data interface to set the suspend flag by writing the suspend flag to the system partition.

In Example 51, the subject matter of any one of Examples 45-50 can optionally include that the non-volatile dual-purpose system and storage memory includes a system partition and an operating system partition, the suspend data interface further to, when entering the low-power suspend mode, store an operating system loader and state data in the system partition, the state data including a context of an operating system.

In Example 52, the subject matter of any one of Examples 45-51 can optionally include that the resume from the low-power suspend mode is to be without displaying a basic input/output system (BIOS) startup screen at which a user can select to enter a BIOS setup screen.

Example 53 is at least one article of manufacture including machine readable instructions that, when executed, cause a processor to at least after an operating system enters a low-power standby mode, determine a storage performance of the device to store suspend state data; based on the storage performance of the device, set a suspend flag to indicate a low-power suspend mode; and after detecting a resume request, confirm the setting of the suspend flag and load a standby state resume vector to resume from the low-power suspend mode.

In Example 54, the subject matter of Example 53 can optionally include that the standby state resume vector corresponds to a low-power standby mode that is different from the low-power suspend mode.

In Example 55, the subject matter of any one of Examples 53-54 can optionally include that the instructions are further to cause the processor to determine a presence of a non-volatile dual-purpose system and storage memory based on the storage performance satisfying an access time threshold.

In Example 56, the subject matter of any one of Examples 53-55 can optionally include that to set the suspend flag based on the storage performance of the device, the instructions are to cause the processor to set the suspend flag based on determining the presence of the non-volatile dual-purpose system and storage memory.

In Example 57, the subject matter of any one of Examples 53-56 can optionally include that the non-volatile dual-purpose system and storage memory is to operate as a non-volatile storage memory and as a system memory having bit-level, random access memory capabilities to access data at data transfer rates of at least 1.5 gigabytes per second.

In Example 58, the subject matter of any one of Examples 53-57 can optionally include that the non-volatile dual-purpose system and storage memory includes a system partition and an operating system partition, the instructions to cause the processor to set the suspend flag by writing the suspend flag to the system partition.

In Example 59, the subject matter of any one of Examples 53-58 can optionally include that the non-volatile dual-purpose system and storage memory includes a system partition and an operating system partition, the instructions further to cause the processor to, when entering the low-power suspend mode, store an operating system loader and state data in the system partition, the state data including a context of an operating system.

In Example 60, the subject matter of any one of Examples 53-59 can optionally include that the instructions are further to cause the processor to resume from the low-power suspend mode without displaying a basic input/output system (BIOS) startup screen at which a user can select to enter a BIOS setup screen.

Example 61 is an apparatus to suspend and resume a device. The apparatus of Example 61 includes: means for, after detecting a low-power suspend mode request, determining a storage performance of the device to store suspend state data; means for setting a suspend flag based on the storage performance of the device, the suspend flag to indicate a low-power suspend mode to a processor platform; means for confirming a setting of a resume flag from the processor platform when resuming from the low-power suspend mode, the resume flag to notify an operating system to resume from the low-power suspend mode; and means for restoring state data when the resume flag is set, the state data corresponding to an operating system context from a non-volatile dual-purpose system and storage memory.

In Example 62, the subject matter of Example 61 can optionally include that the non-volatile dual-purpose system and storage memory is capable of storing non-volatile data and providing bit-level and random access to the non-volatile data at data transfer rates of at least 1.5 gigabytes per second.

In Example 63, the subject matter of any one of Examples 61-62 can optionally include that the non-volatile dual-purpose system and storage memory includes a system partition and an operating system partition, the means for setting the suspend flag is to set the suspend flag by writing the suspend flag to the system partition.

In Example 64, the subject matter of any one of Examples 61-63 can optionally include that the means for confirming the setting of the resume flag is to confirm the setting of the resume flag by reading the resume flag from the operating system partition.

In Example 65, the subject matter of any one of Examples 61-64 can optionally include that the non-volatile dual-purpose system and storage memory includes a system partition and an operating system partition, and further include means for storing the operating system loader in the system partition, and for storing the state data in the operating system partition when entering the low-power suspend mode.

In Example 66, the subject matter of any one of Examples 61-65 can optionally include that the resuming from the low-power suspend mode includes resuming from the low-power suspend mode without displaying a basic input/output system (BIOS) startup screen at which a user can select to enter a BIOS setup screen.

Example 67 is an apparatus to resume a device. The apparatus of Example 67 includes: means for initializing a memory interface to a non-volatile dual-purpose system and storage memory that operates as a non-volatile storage memory and as a system memory having bit-level, random access memory capabilities; means for determining a setting of a suspend flag, the suspend flag to indicate a low-power suspend mode to a processor platform; means for launching an operating system loader loaded from the non-volatile dual-purpose system and storage memory; and means for setting a resume flag to notify an operating system to resume from the low-power suspend mode.

In Example 68, the subject matter of Example 67 can optionally include that the non-volatile dual-purpose system and storage memory is capable of storing non-volatile data and providing bit-level and random access to the non-volatile data at data transfer rates of at least 1.5 gigabytes per second.

In Example 69, the subject matter of any one of Examples 67-68 can optionally include that the non-volatile dual-purpose system and storage memory includes a system partition and an operating system partition, the means for determining the setting of the suspend flag is to determine the setting of the suspend flag by reading the suspend flag from the system partition.

In Example 70, the subject matter of any one of Examples 67-69 can optionally include that the means for setting the resume flag is to set the resume flag by writing the resume flag to the operating system partition.

In Example 71, the subject matter of any one of Examples 67-70 can optionally include that the non-volatile dual-purpose system and storage memory includes a system partition and an operating system partition, and further include means for loading the operating system loader from the operating system partition.

In Example 72, the subject matter of any one of Examples 67-71 can optionally include that the operating system loader is to boot the operating system to resume from the low-power suspend mode without displaying a basic input/output system (BIOS) startup screen at which a user can select to enter a BIOS setup screen.

Example 73 is an apparatus to suspend and resume a device. The apparatus of Example 73 includes: means for, after an operating system enters a low-power standby mode, determining a storage performance of the device to store suspend state data; means for setting a suspend flag based on the storage performance of the device, the suspend flag to indicate a low-power suspend mode; means for confirming the setting of the suspend flag after detecting a resume request; and means for loading a standby state resume vector to resume from the low-power suspend mode.

In Example 74, the subject matter of Example 73 can optionally include that the standby state resume vector corresponds to a low-power standby mode that is different from the low-power suspend mode.

In Example 75, the subject matter of any one of Examples 73-74 can optionally include that the storage performance of the device is indicative of a presence of a non-volatile dual-purpose system and storage memory based on the storage performance satisfying an access time threshold.

In Example 76, the subject matter of any one of Examples 73-75 can optionally include that the means for setting the suspend flag based on the storage performance of the device is to set the suspend flag based on the presence of the non-volatile dual-purpose system and storage memory.

In Example 77, the subject matter of any one of Examples 73-76 can optionally include that the non-volatile dual-purpose system and storage memory is to operate as a non-volatile storage memory and as a system memory having bit-level, random access memory capabilities to access data at data transfer rates of at least 1.5 gigabytes per second.

In Example 78, the subject matter of any one of Examples 73-77 can optionally include that the non-volatile dual-purpose system and storage memory includes a system partition and an operating system partition, the means for setting the suspend flag to set the suspend flag by writing the suspend flag to the system partition.

In Example 79, the subject matter of any one of Examples 73-78 can optionally include that the non-volatile dual-purpose system and storage memory includes a system partition and an operating system partition, and further include means for storing an operating system loader and state data in the system partition when entering the low-power suspend mode, the state data including a context of an operating system.

In Example 80, the subject matter of any one of Examples 73-79 can optionally include that the resume from the low-power suspend mode is to be without displaying a basic input/output system (BIOS) startup screen at which a user can select to enter a BIOS setup screen.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to suspend and resume a device, the method comprising:

after detecting a low-power suspend mode request, determining, by executing an instruction with a processor, a storage performance of the device to store suspend state data;

based on the storage performance of the device, setting a suspend flag in a non-volatile dual-purpose system and storage memory by executing an instruction with the processor, the suspend flag to indicate a low-power suspend mode to a processor platform, the non-volatile dual-purpose system and storage memory including a system partition and an operating system partition;

when entering the low-power suspend mode, (a) storing an operating system loader in the system partition, and (b) storing state data in the operating system partition;

when resuming from the low-power suspend mode, confirming, by executing an instruction with the processor, a setting of a resume flag from the processor platform in the non-volatile dual-purpose system and storage memory, the resume flag to notify an operating system to resume from the low-power suspend mode; and when the resume flag is set, restoring, by executing an instruction with the processor, the state data corresponding to an operating system context from the non-volatile dual-purpose system and storage memory.

2. The method of claim 1, wherein the non-volatile dual-purpose system and storage memory is capable of storing non-volatile data and providing bit-level and random access to the non-volatile data at data transfer rates of at least 1.5 gigabytes per second.

3. The method of claim 1, wherein the setting of the suspend flag includes writing the suspend flag to the system partition.

4. The method of claim 1, wherein the confirming of the setting of the resume flag includes reading the resume flag from the operating system partition.

5. The method of claim 1, further including resuming from the low-power suspend mode without displaying a basic input/output system (BIOS) startup screen at which a user can select to enter a BIOS setup screen.

6. An apparatus to suspend and resume a device, the apparatus comprising:

a capabilities tester to, after detecting a low-power suspend mode request, determine a storage performance of the device to store suspend state data;

a suspend data interface to:

based on the storage performance of the device, set a suspend flag in a non-volatile dual-purpose system and storage memory, the suspend flag to indicate a low-power suspend mode to a processor platform, the non-volatile dual-purpose system and storage memory including a system partition and an operating system partition, and when entering the low-power suspend mode, (a) store an operating system loader in the system partition, and (b) store state data in the operating system partition; and the operating system loader to:

when resuming from the low-power suspend mode, confirm a setting of a resume flag from the processor platform in the non-volatile dual-purpose system and storage memory, the resume flag to notify an operating system to resume from the low-power suspend mode; and when the resume flag is set, restore the state data corresponding to an operating system context from the non-volatile dual-purpose system and storage memory.

7. The apparatus of claim 6, wherein the non-volatile dual-purpose system and storage memory is capable of storing non-volatile data and providing bit-level and random access to the non-volatile data at data transfer rates of at least 1.5 gigabytes per second.

8. The apparatus of claim 6, wherein the suspend data interface is to set the suspend flag by writing the suspend flag to the system partition.

9. The apparatus of claim 6, wherein the operating system loader is to confirm the setting of the resume flag by reading the resume flag from the operating system partition.

10. The apparatus of claim 6, wherein the resuming from the low-power suspend mode includes resuming from the low-power suspend mode without displaying a basic input/output system (BIOS) startup screen at which a user can select to enter a BIOS setup screen.

11. At least one article of manufacture comprising machine readable instructions that, when executed, cause a processor to at least:
    after detecting a low-power suspend mode request, determine a storage performance of a device to store suspend state data;
    based on the storage performance of the device, set a suspend flag in a non-volatile dual-purpose system and storage memory, the suspend flag to indicate a low-power suspend mode to a processor platform, the non-volatile dual-purpose system and storage memory including a system partition and an operating system partition;
    when entering the low-power suspend mode, (a) store an operating system loader in the system partition, and (b) store state data in the operating system partition;
    when resuming from the low-power suspend mode, confirm a setting of a resume flag from the processor platform in the non-volatile dual-purpose system and storage memory, the resume flag to notify an operating system to resume from the low-power suspend mode; and
    when the resume flag is set, restore the state data corresponding to an operating system context from the non-volatile dual-purpose system and storage memory.

12. The at least one article of manufacture of claim 11, wherein the non-volatile dual-purpose system and storage memory is capable of storing non-volatile data and providing bit-level and random access to the non-volatile data at data transfer rates of at least 1.5 gigabytes per second.

13. The at least one article of manufacture of claim 11, wherein the instructions are to cause the processor to set the suspend flag by writing the suspend flag to the system partition.

14. The at least one article of manufacture of claim 11, wherein the instructions are to cause the processor to confirm the setting of the resume flag by reading the resume flag from the operating system partition.

15. The at least one article of manufacture of claim 11, wherein the instructions are further to cause the processor to resume from the low-power suspend mode without displaying a basic input/output system (BIOS) startup screen at which a user can select to enter a BIOS setup screen.

* * * * *